US012795020B2

(12) United States Patent
Auster et al.

(10) Patent No.: US 12,795,020 B2
(45) Date of Patent: Nov. 10, 2026

(54) CLOUD-BASED AUTOMATED ASSISTANT FOR HANDLING INCOMING TELEPHONE CALL(S)

(71) Applicant: GOOGLE LLC, Mountain View, CA (US)

(72) Inventors: Dekel Auster, Tel Aviv (IL); Yoav Tzur, Tel Aviv (IL); Ran El Manor, Savyon (IL); Ohad Dekel, Ganey Tikva (IL); Liran Peretz, Tel Mond (IL)

(73) Assignee: GOOGLE LLC, Mountain View, CA (US)

( * ) Notice: Subject to any disclaimer, the term of this patent is extended or adjusted under 35 U.S.C. 154(b) by 121 days.

(21) Appl. No.: 18/594,884

(22) Filed: Mar. 4, 2024

(65) Prior Publication Data

US 2025/0280068 A1 Sep. 4, 2025

(51) Int. Cl.
*H04M 3/436* (2006.01)
*G08B 3/10* (2006.01)
(Continued)

(52) U.S. Cl.
CPC ........ *H04M 3/4365* (2013.01); *G08B 3/1008* (2013.01); *G08B 5/224* (2013.01);
(Continued)

(58) Field of Classification Search
CPC ........... H04M 3/4365; H04M 3/42059; H04M 3/53308; H04M 3/54; H04M 3/436;
(Continued)

(56) References Cited

U.S. PATENT DOCUMENTS 5,815,566 A 9/1998 Ramot et al.
6,304,653 B1 10/2001 O'Neil et al.
(Continued)

FOREIGN PATENT DOCUMENTS

CN 103795877 5/2014
CN 105592237 5/2016
(Continued)

OTHER PUBLICATIONS

European Patent Office; International Search Report and Written Opinion issued in Application No. PCT/US2025/015252; 14 pages; dated May 6, 2025.

*Primary Examiner* — Akelaw Teshale
(74) *Attorney, Agent, or Firm* — Gray Ice Higdon

(57) ABSTRACT

Implementations are directed to a cloud-based automated assistant that can handle incoming telephone calls on behalf of a user. In some implementations, processor(s) of a remote server can receive an indication of an incoming telephone call that is directed to a client device and via a cloud-based automated assistant executing at least in part at the remote server (e.g., that is remote from the client device). The processor(s) can determine a next action to be implemented by the cloud-based automated assistant and cause the next action to be implemented by the cloud-based automated assistant. In some implementations, the indication of the incoming telephone call can be directed to the cloud-based automated assistant (e.g., without the client device routing the incoming telephone call to the cloud-based automated assistant). In other implementations, the indication of the incoming telephone call is routed to the cloud-based automated assistant via the client device.

20 Claims, 10 Drawing Sheets

(51) Int. Cl.
*G08B 5/22* (2006.01)
*G10L 13/02* (2013.01)
*H04M 3/42* (2006.01)
*H04M 3/533* (2006.01)
*H04M 3/54* (2006.01)

(52) U.S. Cl.
CPC ......... *G10L 13/02* (2013.01); *H04M 3/42059* (2013.01); *H04M 3/53308* (2013.01); *H04M 3/54* (2013.01)

(58) Field of Classification Search
CPC ................ H04M 3/4936; H04M 3/527; G08B 3/1008; G08B 5/224; G10L 13/02; H04L 65/1046; H04L 65/1096; H04L 65/1076
See application file for complete search history.

(56) References Cited

U.S. PATENT DOCUMENTS 6,377,567 B1 4/2002 Leonard
6,731,725 B1 5/2004 Merwin et al.
6,922,465 B1 7/2005 Howe
7,084,758 B1 8/2006 Cole
7,337,158 B2 2/2008 Fratkina et al.
7,539,656 B2 5/2009 Fratkina et al.
7,792,773 B2 9/2010 McCord et al.
7,920,678 B2 4/2011 Cooper et al.
8,345,835 B1 1/2013 Or-Bach et al.
8,494,121 B1 7/2013 Barnett
8,594,308 B2 11/2013 Soundar
8,938,058 B2 1/2015 Soundar
8,964,963 B2 2/2015 Soundar
9,226,159 B1 * 12/2015 Cao ....................... H04W 12/12
9,232,369 B1 1/2016 Fujisaki
9,318,108 B2 4/2016 Gruber et al.
9,467,566 B2 10/2016 Soundar
9,473,637 B1 10/2016 Venkatapathy et al.
9,548,050 B2 * 1/2017 Gruber .................... G06F 3/167
10,542,143 B2 1/2020 Segalis et al.
10,715,648 B1 * 7/2020 Vashisht ................. H04M 3/20
10,764,433 B2 * 9/2020 Collinson ............. H04M 1/663
11,012,560 B2 5/2021 Segalis et al.
11,102,344 B1 * 8/2021 Buentello ........... G10L 15/1822
11,153,435 B2 * 10/2021 Grabowski ....... H04M 3/42059
11,563,850 B2 1/2023 Segalis et al.
2002/0051522 A1 5/2002 Merrow et al.
2002/0055975 A1 5/2002 Petrovykh
2003/0009530 A1 1/2003 Philonenko
2003/0063732 A1 4/2003 Mcknight
2004/0001575 A1 1/2004 Tang
2004/0083195 A1 4/2004 McCord et al.
2004/0213384 A1 10/2004 Alles et al.
2004/0240642 A1 12/2004 Crandell et al.
2005/0147227 A1 7/2005 Chervirala et al.
2005/0175168 A1 8/2005 Summe et al.
2005/0271250 A1 12/2005 Vallone et al.
2006/0039365 A1 2/2006 Ravikumar et al.
2006/0056600 A1 3/2006 Merrow et al.
2006/0215824 A1 9/2006 Mitby et al.
2007/0036320 A1 2/2007 Mandalia et al.
2007/0201664 A1 8/2007 Salafia
2008/0181371 A1 7/2008 Merrow et al.
2008/0209449 A1 8/2008 Maehira
2008/0309449 A1 12/2008 Martin et al.
2009/0022293 A1 1/2009 Routt
2009/0029674 A1 1/2009 Brezina et al.
2009/0089096 A1 4/2009 Schoenberg
2009/0089100 A1 4/2009 Nenov et al.
2009/0137278 A1 5/2009 Haru et al.
2009/0232295 A1 9/2009 Ryskamp
2010/0088613 A1 4/2010 DeLuca et al.
2010/0094668 A1 4/2010 Gupta
2010/0104087 A1 4/2010 Byrd et al.
2010/0124325 A1 5/2010 Weng et al.
2010/0228590 A1 9/2010 Muller et al.
2011/0092187 A1 4/2011 Miller
2011/0270687 A1 11/2011 Bazaz
2012/0016678 A1 * 1/2012 Gruber .................... G06F 3/167 704/E21.001
2012/0109759 A1 5/2012 Oren et al.
2012/0147762 A1 6/2012 Hancock et al.
2012/0157067 A1 6/2012 Turner et al.
2012/0173243 A1 7/2012 Anand et al.
2012/0271676 A1 10/2012 Aravamudan et al.
2013/0060587 A1 3/2013 Bayrak et al.
2013/0077772 A1 3/2013 Lichorowic et al.
2013/0090098 A1 4/2013 Gidwani
2013/0136248 A1 5/2013 Kaiser-Nyman et al.
2013/0163741 A1 6/2013 Balasaygun et al.
2013/0275164 A1 10/2013 Gruber et al.
2014/0024362 A1 1/2014 Kang et al.
2014/0029734 A1 1/2014 Kim et al.
2014/0037084 A1 2/2014 Dutta
2014/0107476 A1 4/2014 Tung et al.
2014/0122077 A1 5/2014 Nishikawa et al.
2014/0122618 A1 5/2014 Duan
2014/0146962 A1 5/2014 Busayapongchai
2014/0200928 A1 7/2014 Watanabe et al.
2014/0207882 A1 7/2014 Joo et al.
2014/0247933 A1 9/2014 Soundar
2014/0279050 A1 9/2014 Makar et al.
2014/0280464 A1 9/2014 De Ding et al.
2014/0310365 A1 10/2014 Sample et al.
2015/0139413 A1 5/2015 Hewitt et al.
2015/0142704 A1 5/2015 London
2015/0150019 A1 5/2015 Sheaffer et al.
2015/0163341 A1 6/2015 Skovron
2015/0172864 A1 6/2015 Fabrikant
2015/0201013 A1 7/2015 Nonaka
2015/0237203 A1 8/2015 Siminoff
2015/0248817 A1 9/2015 Steir et al.
2015/0281446 A1 10/2015 Milstein et al.
2015/0339707 A1 11/2015 Harrison et al.
2015/0347399 A1 12/2015 Aue et al.
2015/0350331 A1 12/2015 Kumar
2015/0358790 A1 12/2015 Nasserbakht
2016/0028891 A1 1/2016 Pirat et al.
2016/0105546 A1 4/2016 Keys et al.
2016/0139998 A1 5/2016 Dunn et al.
2016/0198045 A1 7/2016 Kulkarni et al.
2016/0212266 A1 7/2016 Soundar
2016/0227033 A1 8/2016 Song
2016/0227034 A1 8/2016 Kulkarni et al.
2016/0277569 A1 9/2016 Shine et al.
2016/0379230 A1 12/2016 Chen
2017/0037084 A1 2/2017 Fasan
2017/0039194 A1 2/2017 Tschetter
2017/0061091 A1 3/2017 McElhinney et al.
2017/0094052 A1 3/2017 Zhang et al.
2017/0177298 A1 6/2017 Hardee et al.
2017/0180499 A1 6/2017 Gelfenbeyn et al.
2017/0289332 A1 10/2017 Lavian et al.
2017/0358296 A1 12/2017 Segalis et al.
2017/0359463 A1 12/2017 Segalis et al.
2017/0359464 A1 12/2017 Segalis et al.
2017/0365277 A1 12/2017 Park
2018/0020093 A1 * 1/2018 Bentitou ................. G10L 13/00
2018/0041638 A1 * 2/2018 Gupta ..................... H04L 67/02
2018/0124255 A1 5/2018 Kawamura et al.
2018/0133900 A1 5/2018 Breazeal et al.
2018/0152558 A1 * 5/2018 Chan ....................... H04W 4/16
2018/0220000 A1 8/2018 Segalis et al.
2018/0227416 A1 8/2018 Segalis et al.
2018/0227417 A1 8/2018 Segalis et al.
2018/0227418 A1 8/2018 Segalis et al.
2019/0158647 A1 * 5/2019 Vaananen .............. G06N 20/00
2019/0281159 A1 9/2019 Segalis et al.
2019/0306314 A1 10/2019 Segalis et al.
2020/0042597 A1 2/2020 Wu
2020/0259951 A1 * 8/2020 Arshad ................ H04M 3/4211
2020/0279228 A1 * 9/2020 Vaananen .......... G06Q 10/1093
2020/0374398 A1 * 11/2020 Sharma .......... G06Q 10/063112
2021/0243300 A1 8/2021 Segalis et al.

(56) References Cited

U.S. PATENT DOCUMENTS

| | | | | |
|---|---|---|---|---|
| 2022/0366903 | A1 * | 11/2022 | Carbune | G10L 17/14 |
| 2023/0164268 | A1 | 5/2023 | Segalis et al. | |
| 2023/0179704 | A1 * | 6/2023 | Chinthakunta | H04M 3/527 379/142.06 |

FOREIGN PATENT DOCUMENTS

| | | | |
|---|---|---|---|
| EP | 1679693 | | 7/2006 |
| JP | 2004508748 | | 3/2004 |
| JP | 2007219385 | | 8/2007 |
| JP | 2007524928 | | 8/2007 |
| JP | 2008015439 | | 1/2008 |
| JP | 2008022406 | A | 1/2008 |
| JP | 2009210703 | | 9/2009 |
| JP | 2015070371 | | 2/2015 |
| JP | 2015132987 | A | 7/2015 |
| JP | 2016095582 | A | 5/2016 |
| KR | 20130099423 | | 9/2013 |
| KR | 20140121105 | | 10/2014 |
| WO | 2007065193 | | 6/2007 |
| WO | 2015020942 | | 2/2015 |
| WO | 2014197635 | | 12/2017 |

* cited by examiner

CLOUD-BASED AUTOMATED ASSISTANT FOR HANDLING INCOMING TELEPHONE CALL(S)

BACKGROUND

Humans may engage in human-to-computer dialogs with interactive software applications referred to as "chatbots," "automated assistants", "intelligent personal assistants," etc. (referred to herein as "automated assistants"). As one example, these automated assistants may correspond to a machine learning model or a combination of different machine learning models, and may be utilized to perform various tasks on behalf of users. For instance, some of these automated assistants can initiate outgoing telephone calls and answer incoming telephone calls. During these telephone calls, some of these automated assistants conduct conversations with various human users or other automated assistants. In conducting these conversations, these automated assistants can cause corresponding instances of synthesized speech to be rendered at a corresponding client device of the various human users or other automated assistants, and receive instances of corresponding audio data from the various human users or other automated assistants. Based on the instances of the synthesized speech and/or the instances of the audio data, these automated assistants can then alert the user as to a result of these telephone calls.

However, when these automated assistants are implemented locally at a client device, they typically consume computational resources and battery resources at the client device. For instance, these automated assistants may utilize automatic speech recognition (ASR) model(s), natural language understanding (NLU) model(s) or large language model(s) (LLM(s)), and/or text-to-speech (TTS) model(s) in conducting conversations during these telephone calls. Further, in instances where these automated assistants answer incoming telephone calls, the user may not even know that these automated assistants are consuming these computational and battery resources since these automated assistants can conduct these conversations as background processes. Moreover, in instances where these automated assistants answer incoming telephone calls, these automated assistants may fail when the client device at which they are implemented has less than a threshold state of charge since there are little/no battery resources to consume.

SUMMARY

Implementations described herein are directed to a cloud-based automated assistant that can handle incoming telephone calls on behalf of a user. In some implementations, processor(s) of a remote server (or cluster of remote servers) can receive an indication of an incoming telephone call that is directed to a client device and via a cloud-based automated assistant executing at least in part at the remote server (e.g., that is remote from the client device). The processor(s) can determine a next action to be implemented by the cloud-based automated assistant and cause the next action to be implemented by the cloud-based automated assistant. The next action to be implemented can include, for example, causing the incoming telephone call to be forwarded to the client device of the user; causing the incoming telephone to be forwarded to an additional client device of the user (e.g., that is in addition to the client device to which the incoming telephone call was directed and that is associated with a different telephone number); causing the cloud-based automated assistant to generate a notification and transmit it to the client device (or the additional client device); causing the cloud-based automated assistant to instruct the caller to leave a voicemail and forward the voicemail to the client device (or the additional client device); and/or other actions.

In some implementations, the processor(s) can determine whether to cause the cloud-based automated assistant to answer the incoming telephone call. For example, the processor(s) can compare a telephone number associated with the incoming telephone call to a deny list of telephone numbers. The deny list of telephone numbers can include a list of telephone numbers that are associated with, for example, known telemarketers, spammers, scammers, and/or other telephone numbers for which the user would not the incoming telephone call if the user knew the caller is a telemarketer, spammer, scammer, etc. Further, and in response to determining that the caller telephone number is included on the deny list of telephone numbers, the processor(s) can cause the cloud-based automated assistant to refrain from answering the incoming telephone call. Notably, in these implementations, no indication of the incoming telephone call may be rendered at the client device of the user, such that the user is not even aware that the telemarketer, spammer, scammer, etc. attempted to call the user. However, and in response to determining that the caller telephone number is not included on the deny list of telephone numbers, the processor(s) can cause the cloud-based automated assistant to answer the incoming telephone call.

In some implementations, and subsequent to answering the incoming telephone call, the processor(s) can cause the cloud-based automated assistant to generate one or more corresponding instances of synthesized speech, and render one or more of the corresponding instances of the synthesized speech, at an additional client device of the caller, to conduct a conversation with the caller that initiated the incoming telephone call. For example, the cloud-based automated assistant can greet the caller, identify itself as an assistant to the user, ask the caller a reason for calling the user, etc. Further, the processor(s) can receive one or more corresponding instances of audio data that each capture speech of the caller. For example, the audio data can identify the caller, provide the reason for calling the user, etc. Based on the conversation between the cloud-based automated assistant and the caller, the processor(s) can determine the next action to be implemented by the cloud-based automated assistant.

In some implementations, and in addition to determining the next action to be implemented by the cloud-based automated assistant based on the conversation, the processor(s) can determine the next action to be implemented by the cloud-based automated assistant based on a user state of the user. The user state can, for example, indicate whether the user is available to answer the incoming telephone call at the client device (and/or the additional client device of the user), indicate whether the user is a threshold distance away from the client device (and/or the additional client device of the user), and/or other user state information. Further, the user state can be determined based on, for example, calendar information associated with the user, software application activity data associated with the user, user profile data associated with the user, or sensor data generated by the client device. In implementations where the user state is determined based on information that is local to the client device (or the additional client device), the client device can continuously or periodically (e.g., every minute, every 5 minutes, every 10 minutes, every hour, etc.) transmit an indication of the user state to the remote server.

In additional or alternative implementations, and in addition to determining the next action to be implemented by the cloud-based automated assistant based on the conversation, the processor(s) can determine the next action to be implemented by the cloud-based automated assistant based on a client device state of the client device of the user. The client device state can, for example, indicate whether a state of charge of the client device (and/or the additional client device of a user) is below a threshold state of charge, indicate whether a mode of the client device (and/or the additional client device of a user) is associated with the user's current availability, indicate whether the client device (and/or the additional client device of a user) is a threshold distance away from the user, and/or other client device state information. Further, the client device state can be determined based on, for example, sensor data generated by the client device. In implementations where the client device state is determined based on information that is local to the client device (or the additional client device), the client device can continuously or periodically (e.g., every minute, every 5 minutes, every 10 minutes, every hour, etc.) transmit an indication of the client device state to the remote server.

As some non-limiting examples, assume that the processor(s) receive an indication of an incoming telephone call that is directed to the user of the client device and determine to answer the incoming telephone call (e.g., a telephone number associated with the caller is not on the deny list). Further assume that the processor(s) cause the cloud-based automated assistant to conduct a conversation with the caller. In one example, the caller may indicate that they urgently need to speak with the user of the client device. In this example, the processor(s) can cause the cloud-based automated assistant to forward the incoming telephone call to the user's mobile phone. However, if a user state of the user indicates that the user is beyond a threshold distance from the mobile phone (e.g., the user is on a run left their phone at home but has a smart watch) and/or if a client device state of the client device indicates that the user's mobile phone is dead (but the user has a smart watch), then the processor(s) can cause the cloud-based automated assistant to forward the incoming telephone call to the user's smart watch (which may be associated with a different telephone number than the user's mobile phone). In another example, the caller may indicate that they are calling the user to confirm an upcoming appointment or reservation. In this example, the processor(s) can cause the cloud-based automated assistant to generate a notification that can be transmitted to the user's mobile phone and/or smart watch. Additionally, or alternatively, the processor(s) can cause the cloud-based automated assistant to instruct the caller to leave a voicemail that can be transmitted to the user's mobile phone and/or smart watch. In another example, the caller may indicate that they are calling the user to request that the user purchase an unsolicited good or service. In this example, the processor(s) can cause the cloud-based automated assistant to terminate the telephone call (and optionally add a telephone number associated with the caller to the deny list of telephone numbers).

Although particular examples are described above, it should be understood that those examples are provided for the sake of illustrating techniques contemplated herein and are not meant to be limiting. Rather, it should be understood that the next action determined can vary based on the conversation between the cloud-based automated assistant and the caller, based on the user state of the user, based on the client device state of various client devices of the user, and/or based on other signals.

In some implementations, the indication of the incoming telephone call can be routed directly to the cloud-based automated assistant (e.g., without the client device routing the incoming telephone call to the cloud-based automated assistant). For example, when the caller initiates the incoming telephone call, it can be directed to the remote server and without the client device of the user initially ringing to indicate that there is an incoming telephone call. However, it should be understood that in other implementations, the indication of the incoming telephone call is routed to the cloud-based automated assistant via the client device. For example, when the caller initiates the incoming telephone call, it can be initially directed to the client device but routed to the remote server (and optionally without the client device of the user initially ringing to indicate that there is an incoming telephone call). In these implementations, whether the incoming telephone call is routed to the remote server can be based on, for example, the user state of the user, the client device state of various client devices of the user, and/or other signals.

By providing the cloud-based automated assistant to handle incoming telephone calls on behalf of a user, one or more technical advantages can be achieved. For example, computational resources, local storage resources, and battery resources at the client device need not be consumed at the client device to execute a local automated assistant for handling the incoming calls, thereby conserving these computational resources, local storage resources, and battery resources. Further, instances in which incoming telephone calls may fail (e.g., when the client device at which they are implemented has less than a threshold state of charge since there are little/no battery resources to consume) are mitigated and/or eliminated, thereby conserving these computational resources, local storage resources, and battery resources, and also telephone network resources since the caller need not call the user again and/or the user need not call the caller back. Moreover, the cloud-based automated assistant can dynamically determine the next action based on various factors, including determining the next action to be implemented based on those which consume relatively fewer computational and/or network resources. Furthermore, the cloud-based automated assistant can leverage the virtually limitless resources of the cloud to execute various machine learning models that the client device cannot execute due to local storage constraints, memory constraints, and/or computational constraints, and/or that a party controlling the machine learning model does not want to provide to the client device, thereby objectively improving the quality of conversations between the caller and the cloud-based automated assistant.

The above description is provided as an overview of only some implementations disclosed herein. Those implementations, and other implementations, are described in additional detail herein.

DETAILED DESCRIPTION

Figure 1:
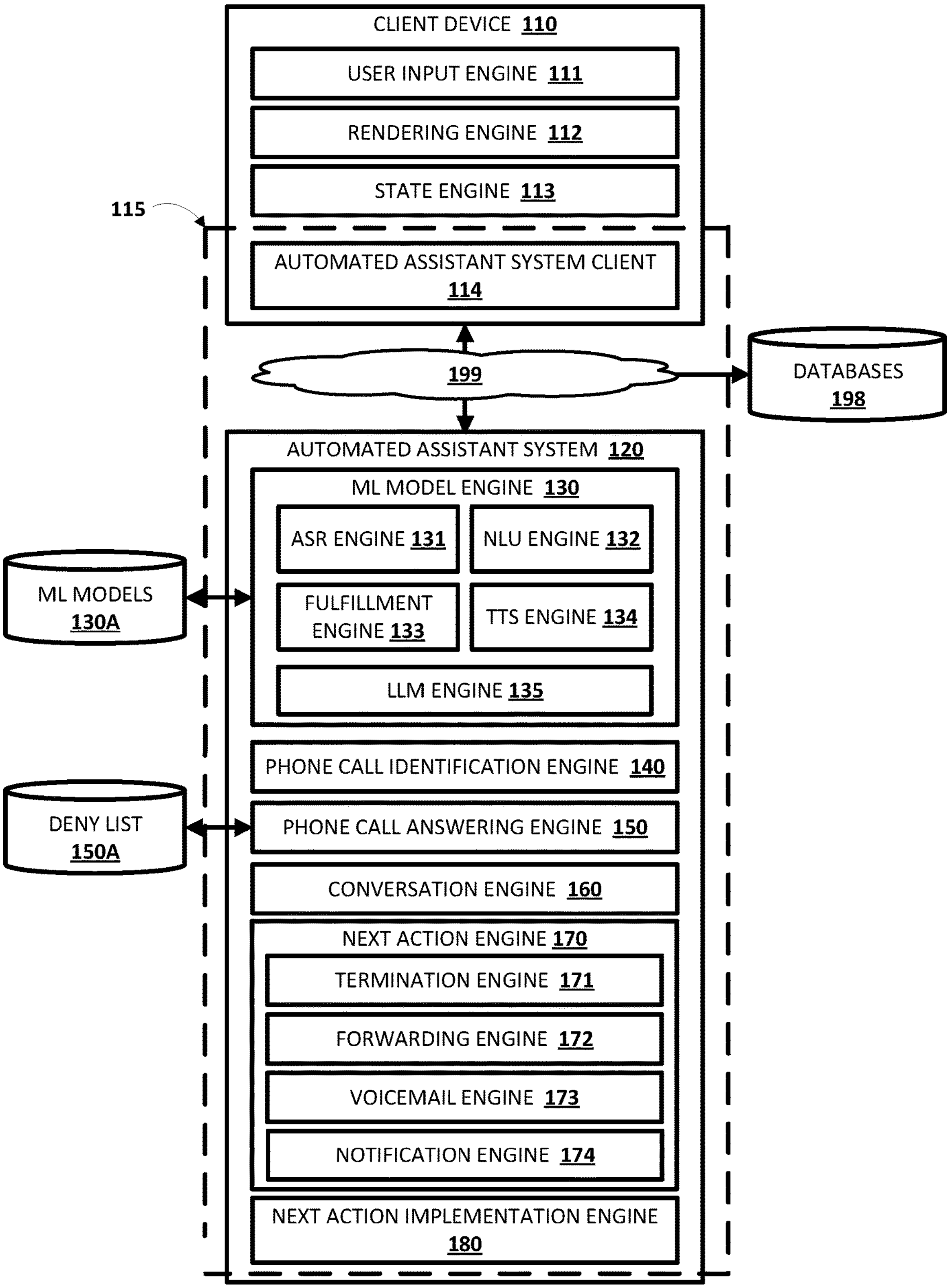
FIG. 1 depicts a block diagram of an example environment that demonstrates various aspects of the present disclosure, and in which implementations disclosed herein can be implemented.

Turning now to FIG. 1, a block diagram of an example environment that demonstrates various aspects of the present disclosure, and in which implementations disclosed herein can be implemented is depicted. A client device 110 is illustrated in FIG. 1, and includes, in various implementations, a user input engine 111, a rendering engine 112, a state engine 113, and an automated assistant system client 114. The client device 110 may be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device, etc.). Additional and/or alternative client devices may be provided.

The user input engine 111 can detect various types of user input at the client device 110. In some examples, the user input detected at the client device 110 can include spoken utterance(s) of a human user of the client device 110 that is detected via microphone(s) of the client device 110. In these examples, the microphone(s) of the client device 110 can generate audio data that captures the spoken utterance(s). In other examples, the user input detected at the client device 110 can include touch input of a human user of the client device 110 that is detected via user interface input device(s) (e.g., touch sensitive display(s)) of the client device 110, and/or typed input detected via user interface input device(s) (e.g., touch sensitive display(s) and/or keyboard(s)) of the client device 110. In these examples, the user interface input device(s) of the client device 110 can generate textual data that captures the touch input and/or the typed input.

The rendering engine 112 can cause content and/or other output to be visually rendered for presentation to the user at the client device 110 (e.g., via a touch sensitive display or other user interface output device(s)) and/or audibly rendered for presentation to the user at the client device 110 (e.g., via speaker(s) or other user interface output device(s)). The content and/or other output can include, for example, a transcript of a dialog between a user of the client device 110 and an automated assistant 115 executing at least in part at the client device 110, a transcript of a dialog between the automated assistant 115 executing at least in part at the client device 110 and an additional user that is in addition to the user of the client device 110, notifications, selectable graphical elements, and/or any other content and/or output described herein.

The state engine 113 can determine a user state of the user of the client device 110 and/or a client device state of the client device 110 (and/or client device states of other client devices of the user). The user state can, for example, indicate whether the user is available to answer the incoming telephone call at the client device 110 (and/or other client devices of the user), indicate whether the user is a threshold distance away from the client device 110 (and/or other client devices of the user), and/or other user state information. Further, the user state can be determined based on, for example, calendar information associated with the user (e.g., stored in databases 198), software application activity data associated with the user (e.g., stored in the databases 198), user profile data associated with the user (e.g., stored in the databases 198), or sensor data generated by the client device 110 (and/or generated by other client devices of the user). Further, the client device state can, for example, indicate whether a state of charge of the client device 110 (and/or other client devices of the user) is below a threshold state of charge, indicate whether a mode of the client device 110 (and/or other client devices of the user) is associated with the user's current availability, indicate whether the client device 110 (and/or other client devices of the user) is a threshold distance away from the user, and/or other client device state information. Further, the client device state can be determined based on, for example, sensor data generated by the client device 110 (and/or generated by other client devices of the user).

Further, the client device 110 is illustrated in FIG. 1 as communicatively coupled, over one or more networks 199 (e.g., any combination of Wi-Fi®, Bluetooth®, or other local area networks (LANs); ethernet, the Internet, or other wide area networks (WANs); and/or other networks), to an automated assistant system 120 implemented remotely from the client device 110 in the so-called "cloud" (hence the term "cloud-based automated assistant"). The automated assistant system 120 can be implemented by, for example, a high-performance server, a cluster of high-performance servers, and/or any other computing device that is remote from the client device 110. The automated assistant system 120 includes, in various implementations, a machine learning (ML) model engine 130, a phone call identification engine 140, a phone call answering engine 150, a conversation 160, a next action engine 170, and a next action implementation engine 170. The ML model engine 130 can include various sub-engines, such as an automatic speech recognition (ASR) engine 131, a natural language understanding (NLU) engine 132, a fulfillment engine 133, a text-to-speech (TTS) engine 134, and a large language model (LLM) engine 135. These various sub-engines can utilize one or more respective ML models (e.g., stored in ML models database 130A). Further, the next action engine 170 can include various sub-engines, such as a termination engine 171, a forwarding engine 172, a voicemail engine 173, and a notification engine 174.

The automated assistant system 120 can leverage various databases. For instance, and as noted above, the ML model engine 130 can the leverage ML models database 130A that stores various ML models; the phone call answering engine 150 can leverage deny list database 150A that stores telephone numbers associated with telemarketers, scammers, spammers, etc.; and the client device 110 and/or the automated assistant system 120 can leverage databases 198 for other information described herein (e.g., calendar data, software application data, user profile data, sensor data, and/or other data). Although FIG. 1 is depicted with respect to certain engines and/or sub-engines of the automated assistant system 120 having access to certain databases, it should be understood that is for the sake of example and is not meant to be limiting.

Moreover, the client device 110 can execute the automated assistant system client 114. An instance of the automated assistant system client 114 can be an application that is separate from an operating system of the client device 110 (e.g., installed "on top" of the operating system)—or can alternatively be implemented directly by the operating system of the client device 110. The automated assistant system client 114 can communicate automated assistant system 120 via one or more of the networks 199 (e.g., as shown in FIG. 1). The automated assistant system client 120 (and optionally by way of its interactions with the automated assistant system 120) may form what appears to be, from a user's perspective, a logical instance of an automated assistant 115. An instance of the automated assistant 115 is depicted in FIG. 1, and is encompassed by a dashed line that includes the automated assistant system client 114 of the client device 110 and the automated assistant system 120.

Furthermore, the client device 110 and/or the automated telephone call system 120 may include one or more memories for storage of data and software applications, one or more processors for accessing data and executing the software applications, and other components that facilitate communication over one or more of the networks 199. In some implementations, one or more of the software applications can be installed locally at the client device 110, whereas in other implementations one or more of the software applications can be hosted remotely from the client device 110 (e.g., by one or more servers), but accessible by the client device 110 over one or more of the networks 199.

As described herein, the automated assistant system 120 can be utilized to handle incoming telephone calls that are directed to the client device 110. By handling the incoming telephone calls that are directed to the client device 110, the automated assistant system 120 can serve as a cloud-based personal call assistant. In some implementations, the incoming telephone call can be initially routed to the cloud-based personal call assistant and without the client device 110 ringing to indicate that there is an incoming telephone card. In some versions of those implementations, the cloud-based personal call assistant may determine that a caller that initiated the incoming telephone call is a known telemarketer, scammer, spammer, etc., and refrain from answering the telephone call. As a result, the cloud-based personal call assistant may refrain from answering the incoming telephone call and the user may not be aware of the incoming telephone call, thereby mitigating and/or eliminating instances of these telephone calls. Further, computational resources and/or battery resources can be conserved at the client device in these implementations. In some versions of those implementations, the cloud-based personal call assistant may answer the incoming telephone call to conduct a conversation with the caller on behalf of the user and determine a next action to be implemented based at least in part on the conversation (and optionally the user state and/or the client device state). Various next actions to be implemented are described in more detail herein (e.g., with respect to FIGS. 2, 3, and 5A-5E). As a result, computational resources and/or battery resources can be conserved at the client device in these implementations. In additional or alternative implementations, the incoming telephone call can be routed to the cloud-based personal call assistant via the client device 110 and optionally without the client device 110 ringing to indicate that there is an incoming telephone card (e.g., based on the user state and/or the client device state). In some versions of those implementations, the client device 110 may still determine to forward an indication of the incoming telephone call to the cloud-based personal call as described in more detail herein (e.g., with respect to FIG. 4).

The conversations described herein can be conducted by the automated assistant system 120. For example, the conversations can be performed during telephone calls conducted using Voice over Internet Protocol (VoIP), public switched telephone networks (PSTN), and/or other telephonic communication protocols. Further, the conversations described herein are automated in that the automated assistant system 120 conducts the conversations and determines the next action to be implemented using one or more of the components depicted in FIG. 1, on behalf of the user of the client device 110, such that the user of the client device 110 is not an active participant in the conversations.

In various implementations, the ASR engine 131 can process, using ASR model(s) stored in the ML models database 130A (e.g., a recurrent neural network (RNN) model, a transformer model, and/or any other type of ML model capable of performing ASR), audio data that captures a spoken utterance and that is generated by microphone(s) of the client device 110 (or microphone(s) of an additional client device) to generate ASR output. Further, the NLU engine 132 can process, using NLU model(s) stored in the ML models database 130A (e.g., a long short-term memory (LSTM), gated recurrent unit (GRU), and/or any other type of RNN or other ML model capable of performing NLU) and/or NLU rule(s), the ASR output (or other typed or touch inputs received via the user input engine 111 of the client device 110) to generate NLU output. Moreover, the fulfillment engine 133 can process, using fulfillment model(s) and/or fulfillment rules stored in the ML models database 130A, the NLU data to generate fulfillment output. Additionally, the TTS engine 134 can process, using TTS model(s) stored in the ML models database 130A, textual content (e.g., text formulated by the automated assistant 115) to generate synthesized speech audio data that includes computer-generated synthesized speech. Furthermore, in various implementations, the LLM engine 135 can replace one or more of the aforementioned components. For instance, the LLM engine 135 can replace the NLU engine 132 and/or the fulfillment engine 133. In these implementations, the LLM engine 135 can process, using LLM(s) stored in the ML models database 130A (e.g., PaLM, BARD, BERT, LaMDA, Meena, GPT, and/or any other LLM, such as any other LLM that is encoder-only based, decoder-only based, sequence-to-sequence based and that optionally includes an attention mechanism or other memory), the ASR output (or other typed or touch inputs received via the user input engine 111 of the client device 110) to generate LLM output.

In various implementations, the ASR output can include, for example, a plurality of speech hypotheses (e.g., term hypotheses and/or transcription hypotheses) that are predicted to correspond to spoken utterance(s) based on the processing of audio data that captures the spoken utterance(s). The ASR engine 131 can optionally select a particular speech hypotheses as recognized text for the spoken utterance(s) based on a corresponding value associated with each of the plurality of speech hypotheses (e.g., probability values, log likelihood values, and/or other values). In various implementations, the ASR model(s) stored in the ML model(s) database 130A are end-to-end speech recognition model(s), such that the ASR engine 131 can generate the plurality of speech hypotheses directly using the ASR model(s). For instance, the ASR model(s) can be end-to-end model(s) used to generate each of the plurality of speech hypotheses on a character-by-character basis (or other token-by-token basis). One non-limiting example of such end-to-end model(s) used to generate the recognized text on a character-by-character basis is a recurrent neural network transducer (RNN-T) model. An RNN-T model is a form of sequence-to-sequence model that does not employ attention mechanisms or other memory. In other implementations, the ASR model(s) are not end-to-end speech recognition model(s) such that the ASR engine 131 can instead generate predicted phoneme(s) (and/or other representations). For instance, the predicted phoneme(s) (and/or other representations) may then be utilized by the ASR engine 131 to determine a plurality of speech hypotheses that conform to the predicted phoneme(s). In doing so, the ASR engine 131 can optionally employ a decoding graph, a lexicon, and/or other resource(s). In various implementations, a corresponding transcription that includes the recognized text can be rendered at the client device 110.

In various implementations, the NLU output can include, for example, annotated recognized text that includes one or more annotations of the recognized text for one or more (e.g., all) of the terms of the recognized text. For example, the NLU engine 132 may include a part of speech tagger (not depicted) configured to annotate terms with their grammatical roles. Additionally, or alternatively, the NLU engine 132 may include an entity tagger (not depicted) configured to annotate entity references in one or more segments of the recognized text, such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. The entity tagger may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity. Additionally, or alternatively, the NLU engine 132 may include a coreference resolver (not depicted) configured to group, or "cluster," references to the same entity based on one or more contextual cues. For example, the coreference resolver may be utilized to resolve the term "them" to "buy theatre tickets" in the natural language input "buy them", based on "theatre tickets" being mentioned in a client device notification rendered immediately prior to receiving input "buy them". In some implementations, one or more components of the NLU engine 132 may rely on annotations from one or more other components of the NLU engine 132. For example, in some implementations the entity tagger may rely on annotations from the coreference resolver in annotating all mentions to a particular entity. Also, for example, in some implementations, the coreference resolver may rely on annotations from the entity tagger in clustering references to the same entity. Also, for example, in some implementations, the coreference resolver may rely on user data of the user of the client device 110 in coreference resolution and/or entity resolution. The user data may include, for example, historical location data, historical temporal data, user preference data, user account data, calendar information, email data, and/or any other user data that is accessible at the client device 110.

In various implementations, the fulfillment output can include, for example, one or more tasks to be performed by the automated assistant 115. For example, the user can provide unstructured free-form natural language input in the form of spoken utterance(s). The spoken utterance(s) can include, for instance, an indication of the one or more tasks to be performed by the automated assistant 115. The one or more tasks may require the automated assistant 115 to provide certain information to the user, engage with one or more external systems on behalf of the user (e.g., an inventory system, a reservation system, etc. via a remote procedure call (RPC)), and/or any other task that may be specified by the user and performed by the automated assistant 115. Accordingly, it should be understood that the fulfillment output may be based on the one or more tasks to be performed by the automated assistant 115 and may be dependent on the corresponding conversations with the user.

In various implementations, the TTS engine 134 can generate synthesized speech audio data that captures computer-generated synthesized speech. The synthesized speech audio data can be rendered at the client device 110 via speaker(s) of the client device 110 and/or other client devices described herein. The synthesized speech may include any output generated by the automated assistant 115 as described herein, and may include, for example, synthesized speech generated as part of a dialog between the user of the client device 110 and the automated assistant 115, as part of an automated telephone call between the automated assistant 115 and a representative associated with an entity (e.g., a human representative associated with the entity, an automated assistant representative associated with the entity, and interactive voice response (IVR) system associated with the entity, etc.), and so on.

In various implementations, the LLM output can include, for example, a probability distribution over a sequence of tokens, such as words, phrases, or other semantic units, that are predicted to be responsive to the spoken utterance(s) or other user inputs provided by the user of the client device 110 and/or other users (e.g., the representative associated with the entity). Notably, the LLM(s) stored in the ML model(s) database 130A can include billions of weights and/or parameters that are learned through training the LLM on enormous amounts of diverse data. This enables these LLM(s) to generate the LLM output as the probability distribution over the sequence of tokens. In these implementations, the LLM engine 135 can replace the NLU engine 132 and/or the fulfillment engine 133 since these LLM(s) can perform the same or similar functionality in terms of natural language processing.

Although FIG. 1 is described with respect to a single client device having a single user, it should be understood that is for the sake of example and is not meant to be limiting. For example, one or more additional client devices of a user can also implement the techniques described herein. For instance, the client device 110, the one or more additional client devices, and/or any other computing devices of the user can form an ecosystem of devices that can employ techniques described herein. These additional client devices and/or computing devices may be in communication with the client device 110 and/or the automated assistant system 120 (e.g., over the one or more networks 199). As another example, a given client device can be utilized by multiple users in a shared setting (e.g., a group of users, a household, etc.). Additional description of the phone call identification engine 140, the phone call answering engine 150, the conversation engine 160, the next action engine 170, and the next action implementation engine 180 is provided herein (e.g., with respect to FIGS. 2, 3, 4, and 5A-5E).

Figure 2:
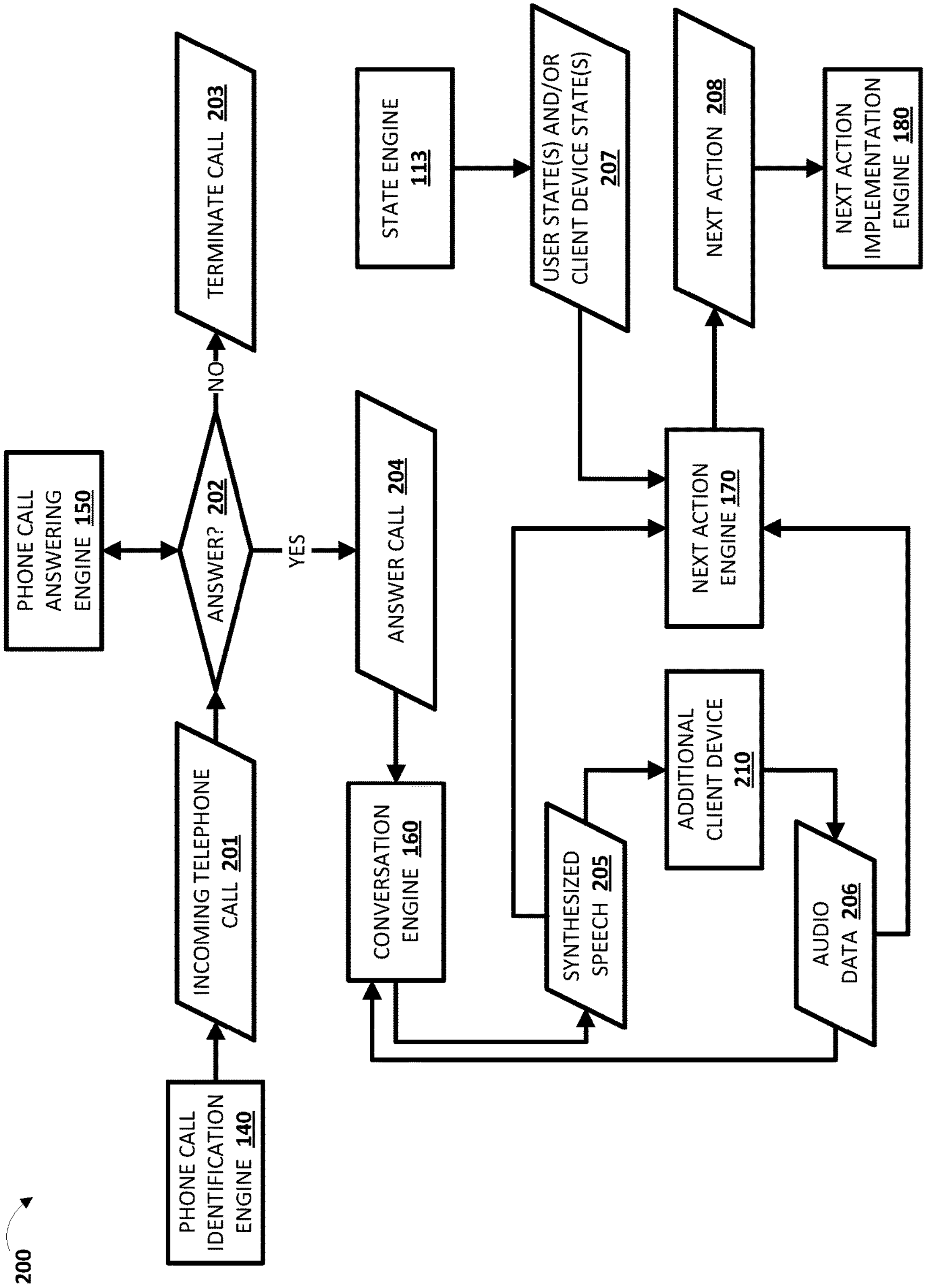
FIG. 2 depicts an example process flow using various components from the example environment from FIG. 1, in accordance with various implementations.

Referring now to FIG. 2, an example process flow 200 for utilizing various components from the example environment of FIG. 1 is depicted. For the sake of example, assume that a telephone call is directed to a telephone number associated with a client device 110 of a user (e.g., an incoming telephone call 201). In this example, the phone call identification engine 140 can receive an indication of the incoming telephone call 201. In some implementations, the phone call identification engine 140 may receive an indication of any incoming telephone call that is directed to the telephone number associated with the client device 110 of the user. In additional or alternative implementations, the phone call identification engine 140 may only receive an indication of an incoming telephone call that is directed to the telephone number associated with the client device 110 of the user based on a user state of the user of the client device 110 and/or based on a client device state of the client device 110 of the user (e.g., determined by the state engine 113). As some non-limiting examples, the phone call identification engine 140 may only receive an indication of an incoming telephone call that is directed to the telephone number associated with the client device 110: if the user is a threshold distance away from the client device 110 (e.g., determined based on proximity sensor(s) of the client device 110); if the user is busy (e.g., in a meeting as indicated by calendar data for the user); if the client device 110 is below a threshold state of charge (e.g., determined based on a battery sensor of the client device 110); if the client device 110 is in a particular mode of operation (e.g., if the client device 110 is off, if the client device 110 is in a "do not disturb" or "work" mode, etc.); and/or in other scenarios contemplated herein.

Further, and in response to receiving the indication of the incoming telephone call, the phone call answering engine 150 can determine whether to answer the incoming telephone call as indicated by 202. In some implementations, the phone call answering engine 150 can compare a caller telephone number associated with the incoming telephone call to a plurality of telephone numbers included in a deny list of telephone numbers (e.g., stored in the deny list database 150A). The deny list can include telephone numbers associated with known telemarketers, spammers, scammers, etc. Notably, the deny list of telephone numbers can be dynamically updated over time as telephone numbers associated with telemarketers, spammers, scammers, etc. are identified by users (e.g., the user of the client device 110 and/or other users) and/or by other means.

Assuming that the phone call answering engine 150 determines to refrain from answering the incoming telephone call (e.g., the telephone number associated with the caller is included on the deny list of telephone numbers), then the phone call answering engine 150 can cause the incoming phone call to be terminated as indicated by 203 (and optionally without alerting the user of the client device 110 to the incoming telephone call). However, and assuming that the phone call answering engine 150 determines to answer the incoming telephone call (e.g., the telephone number associated with the caller is not included on the deny list of telephone numbers), then the phone call answering engine 150 can cause the incoming phone call to be answered as indicated by 204.

In response to answering the incoming telephone call, the conversation engine 160 can cause a cloud-based automated assistant to conduct a conversation with the caller during a telephone call. For instance, and in response to answering the incoming telephone call, the conversation engine 160 can generate a corresponding instance of synthesized speech 205 (e.g., using the TTS model(s) stored in the ML model(s) database 130A) that corresponds to text formulated by the cloud-based automated assistant. The corresponding instance of synthesized speech 205 can, for example, greet the caller, identify itself as an automated assistant employed by the user of the client device 110, ask the caller a certain reason with respect to why the caller is calling the user of the client device 110, etc. Further, the conversation engine 160 can cause the corresponding instance of synthesized speech to be rendered at an additional client device 210 that is associated with the caller and over one or more telephonic networks (e.g., VoIP, PSTN, etc.). Moreover, and in response to rendering the corresponding instance of synthesized speech at the additional client device 210, the conversation engine 160 can receive a corresponding instance of audio data 206 that captures speech of the caller, and over one or more of the telephonic networks, and cause the corresponding instance of audio data 206 to be processed (e.g., using the ASR model(s) stored in the ML model(s) database 130A and optionally the LLM(s), NLU model(s), and/or fulfillment model(s) stored in the ML model(s) database 130A). The corresponding instance of audio data 206 can, for example, identify the caller, identify the certain reason with respect to why the caller is calling the user of the client device 110, and/or include other content.

Notably, while the cloud-based automated assistant is conducting the conversation, the next action engine 170 can process the corresponding instance of synthesized speech 205 and/or the corresponding instance of audio data 206 to determine a next action 208 to be implemented by the cloud-based automated assistant. Although the process flow 200 of FIG. 2 only illustrates a single dialog turn (e.g., the corresponding instance of synthesized speech 205 and the corresponding instance of audio data 206) being processed by the next action engine 170, it should be understood that is for the sake of brevity and is not meant to be limiting. Rather, it should be understood that the conversation engine 160 can continue conducting the conversation until the next action engine 170 determines the next action 208 to be implemented. The next action implementation engine 180 can then cause the next action 208 that is determined to be implemented. Various next actions to be implemented are described in more detail herein (e.g., with respect to FIGS. 3 and 5A-5E).

In some implementations, the state engine 113 can provide an indication of user state(s) of a user of the client device 110 and/or client device state(s) of client device(s) of the user of the client device 110 as indicated by 207. In these implementations, the next action can additionally process the indication of the user state(s) and/or the client device state(s) in determining the next action to be implemented. How the indication of the user state(s) and/or the client device state(s) can be utilized to influence which of the various next actions to be implemented is described in more detail herein (e.g., with respect to FIGS. 3 and 5A-5E).

Figure 3:
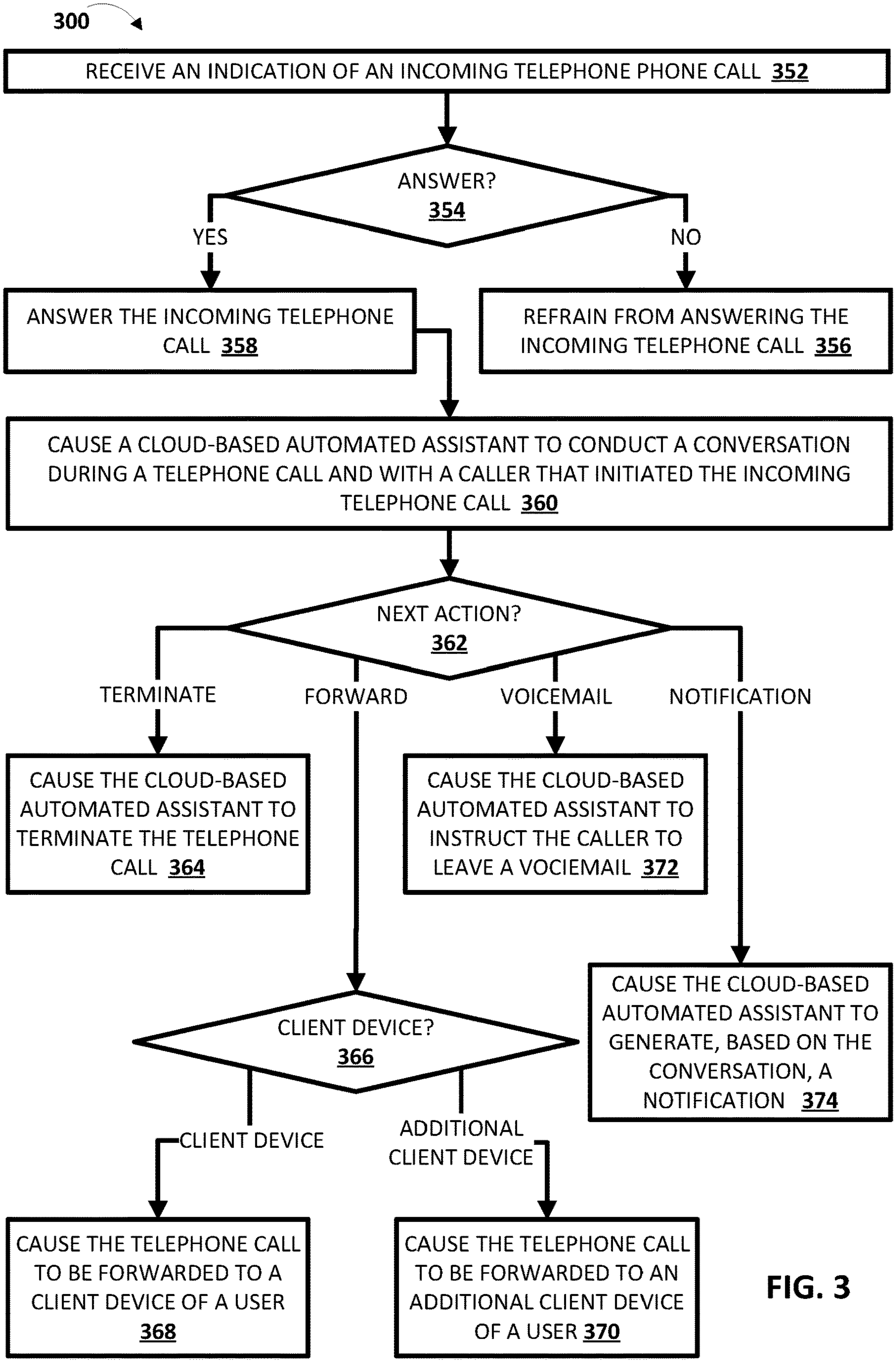
FIG. 3 depicts a flowchart illustrating an example method of server-side functionality for implementing a cloud-based automated assistant to handle incoming telephone calls, in accordance with various implementations.

Turning now to FIG. 3, a flowchart illustrating an example method 300 of server-side functionality for implementing a cloud-based automated assistant to handle incoming telephone calls is depicted. For convenience, the operations of the method 300 are described with reference to a system that performs the operations. This system of the method 300 includes at least one processor, memory, and/or other component(s) of computing device(s) (e.g., automated assistant system 120 of FIG. 1, computing device 610 of FIG. 6, and/or other computing devices). Moreover, while operations of the method 300 are shown in a particular order, this is not meant to be limiting. One or more operations may be reordered, omitted, and/or added.

At block 352, the system receives an indication of an incoming telephone call. The incoming telephone call may be directed to a client device of a user, and the indication of the incoming telephone call can be received via a cloud-based automated assistant that is executed at least in part by the system.

At block 354, the system determines whether to answer the incoming telephone call. The system can determine whether to answer the incoming telephone call based on a caller telephone number associated with a caller that initiated the incoming telephone call. For example, the system can compare the caller telephone number to a deny list of telephone numbers. In this example, if the caller telephone number is included on the deny list of telephone numbers, then the system may determine not to answer the incoming telephone call. However, if the caller telephone number is not included on the deny list of telephone numbers, then the system may determine to answer the incoming telephone call.

If, at an iteration of block 354, the system determines not to answer the incoming telephone call, the system proceeds to block 356. At block 356, the system refrains from answering the incoming telephone call. The method 300 may end and initiate an additional iteration of the method 300 in response to receiving an indication of an additional incoming telephone call.

If, at an iteration of block 354, the system determines not to answer the incoming telephone call, the system proceeds to block 358. At block 358, the system answers the incoming telephone call. At block 360, the system causes a cloud-based automated assistant to conduct a conversation during a telephone call and with a caller that initiated the incoming telephone call. The system can cause the cloud-based automated assistant to conduct the conversation by generating corresponding instances of synthesized speech and by rendering the corresponding instances of synthesized speech at an additional client device of the caller that initiated the incoming telephone call. Further, the system can cause the cloud-based automated assistant to conduct the conversation by receiving corresponding instances of audio data (e.g., capturing speech of the caller) and by processing the corresponding instances of audio data.

At block 362, the system determines a next action to be implemented. The system can determine the next action to be implemented based on content of the conversation between the cloud-based automated assistant and the caller. In some implementations, the system can determine the next action further based on an indication of user state(s) of a user of the client device and/or client device state(s) of client device(s) of the user of the client device. In determining the next action, the system can seek to appropriately handle the telephone call, but while also minimizing computational resources consumed in interacting with the caller, network resources consumed in interacting with the caller, and/or battery resources at the client device of the user.

For example, at an iteration of block 362, the system can determine to terminate the telephone call. In this example, the system can proceed to block 364. At block 364, the system causes the cloud-based automated assistant to terminate the telephone call. An example of causing the cloud-based automated assistant to terminate the telephone call (e.g., via the termination engine 171) is described in more detail with respect to FIG. 5A. The method 300 may end and initiate an additional iteration of the method 300 in response to receiving an indication of an additional incoming telephone call.

As another example, at an iteration of block 362, the system can determine to forward the telephone call. In this example, the system can proceed to block 366. At block 366, the system determines a client device to which the telephone call is to be forwarded. For instance, at an iteration of block 366, the system can determine to forward the telephone call to a client device of a user (e.g., the client device of the user to which the incoming telephone call was initially directed). In this instance, the system proceeds to block 368. At block 368, the system causes the telephone call to be forwarded to the client device of the user. An example of causing the cloud-based automated assistant to forward the telephone call to the client device of the user (e.g., via the forwarding engine 172) is described in more detail with respect to FIG. 5B. The method 300 may end and initiate an additional iteration of the method 300 in response to receiving an indication of an additional incoming telephone call.

Also, for instance, at an iteration of block 366, the system can determine to forward the telephone call to an additional client device of a user. In this instance, the system proceeds to block 370. At block 370, the system causes the telephone call to be forwarded to the additional client device of the user (e.g., the additional client device being in addition to the client device of the user to which the incoming telephone call was initially directed, and the additional client device optionally being associated with a different telephone number). An example of causing the cloud-based automated assistant to forward the telephone call to the additional client device of the user (e.g., via the forwarding engine 172) is described in more detail with respect to FIG. 5C. The method 300 may end and initiate an additional iteration of the method 300 in response to receiving an indication of an additional incoming telephone call.

As yet another example, at an iteration of block 362, the system can determine to instruct the caller to leave a voicemail based on the conversation during the telephone call. In this example, the system can proceed to block 372. At block 372, the system causes the cloud-based automated assistant to instruct the caller to leave the voicemail. The system may then cause an indication of the voicemail to be transmitted to the client device of the user and/or the additional client device of the user (e.g., in the same or similar described with respect to block 366). An example of causing the cloud-based automated assistant to instruct the caller to leave the voicemail (e.g., via the voicemail engine 173) is described in more detail with respect to FIG. 5D. The method 300 may end and initiate an additional iteration of the method 300 in response to receiving an indication of an additional incoming telephone call.

As yet another example, at an iteration of block 362, the system can determine to generate a notification based on the conversation during the telephone call. In this example, the system can proceed to block 374. At block 374, the system causes the cloud-based automated assistant to generate, based on the conversation during the telephone call, a notification. The system may then cause an indication of the notification to be transmitted to the client device of the user and/or the additional client device of the user (e.g., in the same or similar described with respect to block 366). An example of causing the cloud-based automated assistant to generate the notification (e.g., via the notification engine 174) is described in more detail with respect to FIG. 5E. The method 300 may end and initiate an additional iteration of the method 300 in response to receiving an indication of an additional incoming telephone call.

Although certain next actions are described with respect to FIG. 3, it should be understood that those next actions are provided for the sake of example and are not meant to be limiting. Rather, it should be understood that the system can cause the cloud-based automated assistant to perform any next action to handle the incoming telephone call while also minimizing computational resources consumed in interacting with the caller, network resources consumed in interacting with the caller, and/or battery resources at the client device of the user.

Figure 4:
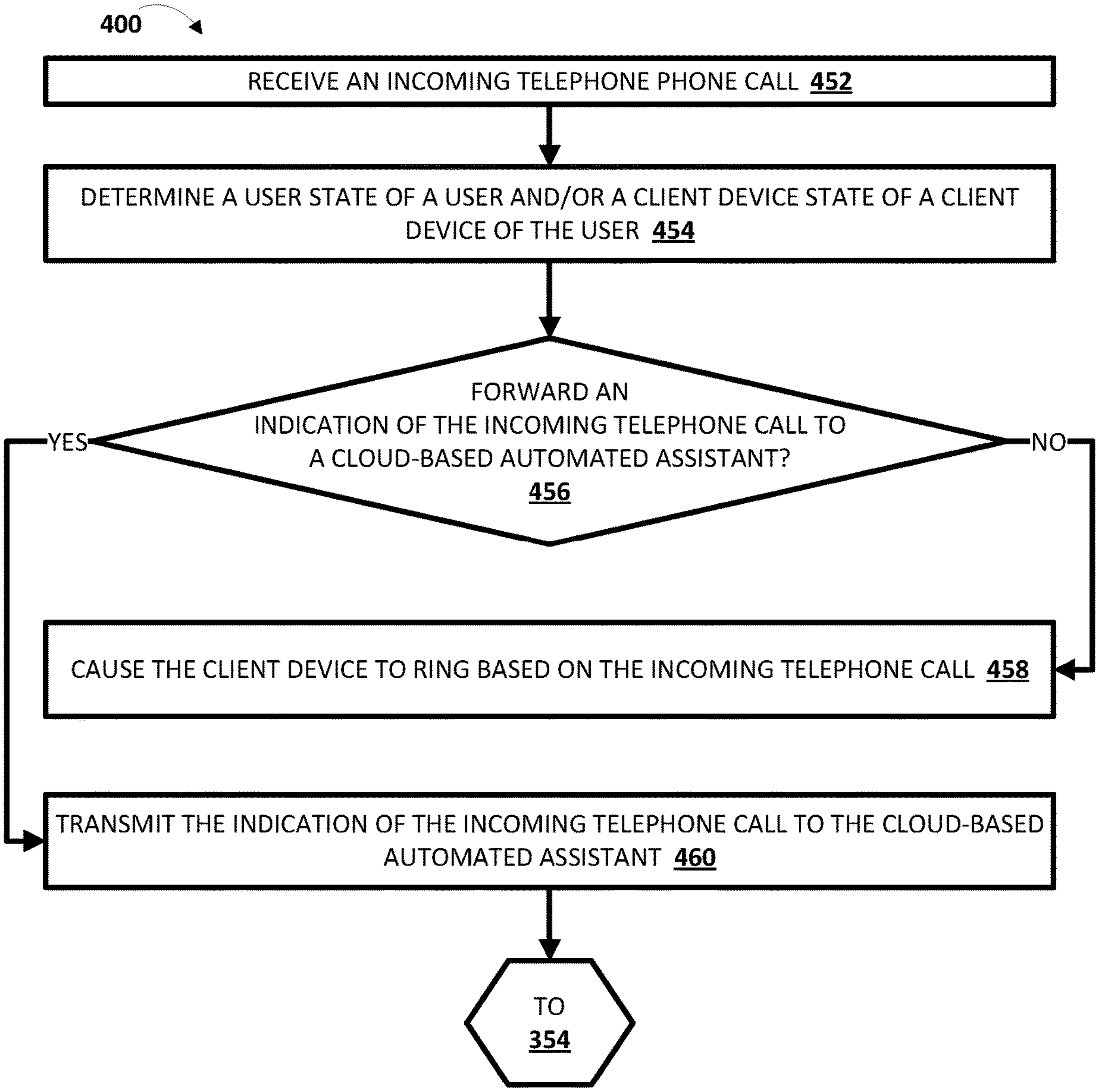
FIG. 4 depicts a flowchart illustrating an example method of client-side functionality for implementing a cloud-based automated assistant to handle incoming telephone calls, in accordance with various implementations.

Turning now to FIG. 4, a flowchart illustrating an example method 400 of client-side functionality for implementing a cloud-based automated assistant to handle incoming telephone calls is depicted. For convenience, the operations of the method 400 are described with reference to a system that performs the operations. This system of the method 400 includes at least one processor, memory, and/or other component(s) of computing device(s) (e.g., client device 110 of FIG. 1, computing device 610 of FIG. 6, and/or other computing devices). Moreover, while operations of the method 400 are shown in a particular order, this is not meant to be limiting. One or more operations may be reordered, omitted, and/or added.

At block 452, the system receives an incoming telephone call. The incoming telephone call may be directed to a client device of a user. In contrast with the method 300 of FIG. 3, the incoming telephone call is initially received at the client device of the user to which the incoming telephone call is directed.

At block 454, the system determines a user state of a user and/or a client device state of a client device of the user. The user state can, for example, indicate whether the user is available to answer the incoming telephone call at the client device, indicate whether the user is a threshold distance away from the client device, and/or other user state information. Further, the system can determine the user state based on, for example, calendar information associated with the user, software application activity data associated with the user, user profile data associated with the user, or sensor data generated by the client device. The client device state can, for example, indicate whether a state of charge of the client device is below a threshold state of charge, indicate whether a mode of the client device is associated with the user's current availability, indicate whether the client device is a threshold distance away from the user, and/or other client device state information. Further, the system can determine the client device state based on, for example, sensor data generated by the client device.

At block 456, the system determines whether to forward an indication of the incoming telephone call to a cloud-based automated assistant. The system can determine whether to forward the indication of the incoming telephone call to the cloud-based automated assistant based on, for example, the user state and/or the client device state. For example, if the user state indicates that the user is in a meeting or otherwise unavailable based on the calendar information associated with the user, that the user is engaged in a certain activity based on the software application activity data associated with the user (e.g., the user is actively using a workout or run tracking application, the user is actively using a video conference application, etc.), that the user is not near the client device (e.g., based on proximity sensor data), then the system can determine to forward the indication of the incoming telephone call to the cloud-based automated assistant. Additionally, or alternatively, if the client device state indicates that the client device has little/no battery or that the client device is in a "do not disturb" mode, then the system can determine to forward the indication of the incoming telephone call to the cloud-based automated assistant.

If, at an iteration of block 456, the system determines not to forward the indication of the incoming telephone call to the cloud-based automated assistant, then the system proceeds to block 458. At block 458, the system causes the client device to ring based on the incoming telephone call. Put another way, the system can cause the client device to ring like the client device typically does in response to receiving incoming telephone calls.

If, at an iteration of block 456, the system determines to forward the indication of the incoming telephone call to the cloud-based automated assistant, then the system proceeds to block 460. At block 460, the system transmits the indication of the incoming telephone call to the cloud-based automated assistant. Put another way, the system can proceed to block 354 of the method 300 of FIG. 3 and continue with an iteration of the method 300 from block 354. Accordingly, in implementations of the method 400 of FIG. 4, the system may only transmit the indication of the incoming telephone call to the cloud-based automated assistant in response to determining that the incoming telephone call is likely to fail absent utilization of the cloud-based automated assistant, where this determination is based on signals that are specific to the user of the client device and/or the client device itself (e.g., as indicated by the user state and/or the client device state).

Turning now to FIGS. 5A-5E, various non-limiting examples of implementing a cloud-based automated assistant to handle incoming telephone calls are depicted. FIGS. 5A-5E each depict a client device 110 (e.g., an instance of the client device 110 from FIG. 1) having a display 190. Although the client device 110 of FIGS. 5A-5E is depicted as a mobile phone, it should be understood that is not meant to be limiting. The client device 110 can be, for example, a stand-alone assistant device (e.g., with speaker(s) and/or a display), a laptop, a desktop computer, a wearable computing device (e.g., a smart watch, smart headphones, etc.), a vehicular computing device, and/or any other client device capable of making telephonic calls. Further, it should be understood that conversations between a cloud-based automated assistant and a caller are depicted at the client device 110 for the sake of illustrating techniques contemplated herein.

The display 190 of the client device 110 in FIGS. 5A-5E further includes a textual input interface element 194 that the user may select to generate user input via a keyboard (virtual or real) or other touch and/or typed input, and a spoken input interface element 195 that the user may select to generate user input via microphone(s) of the client device 110. In some implementations, the user may generate user input via the microphone(s) without selection of the spoken input interface element 195. For example, active monitoring for audible user input via the microphone(s) may occur to obviate the need for the user to select the spoken input interface element 195. In some of those and/or in other implementations, the spoken input interface element 195 may be omitted. Moreover, in some implementations, the textual input interface element 194 may additionally and/or alternatively be omitted (e.g., the user may only provide audible user input). The display 190 of the client device 110 in FIGS. 5A-5E also includes system interface elements 191,

192, 193 that may be interacted with by the user to cause the client device 110 to perform one or more actions.

Figure 5A:
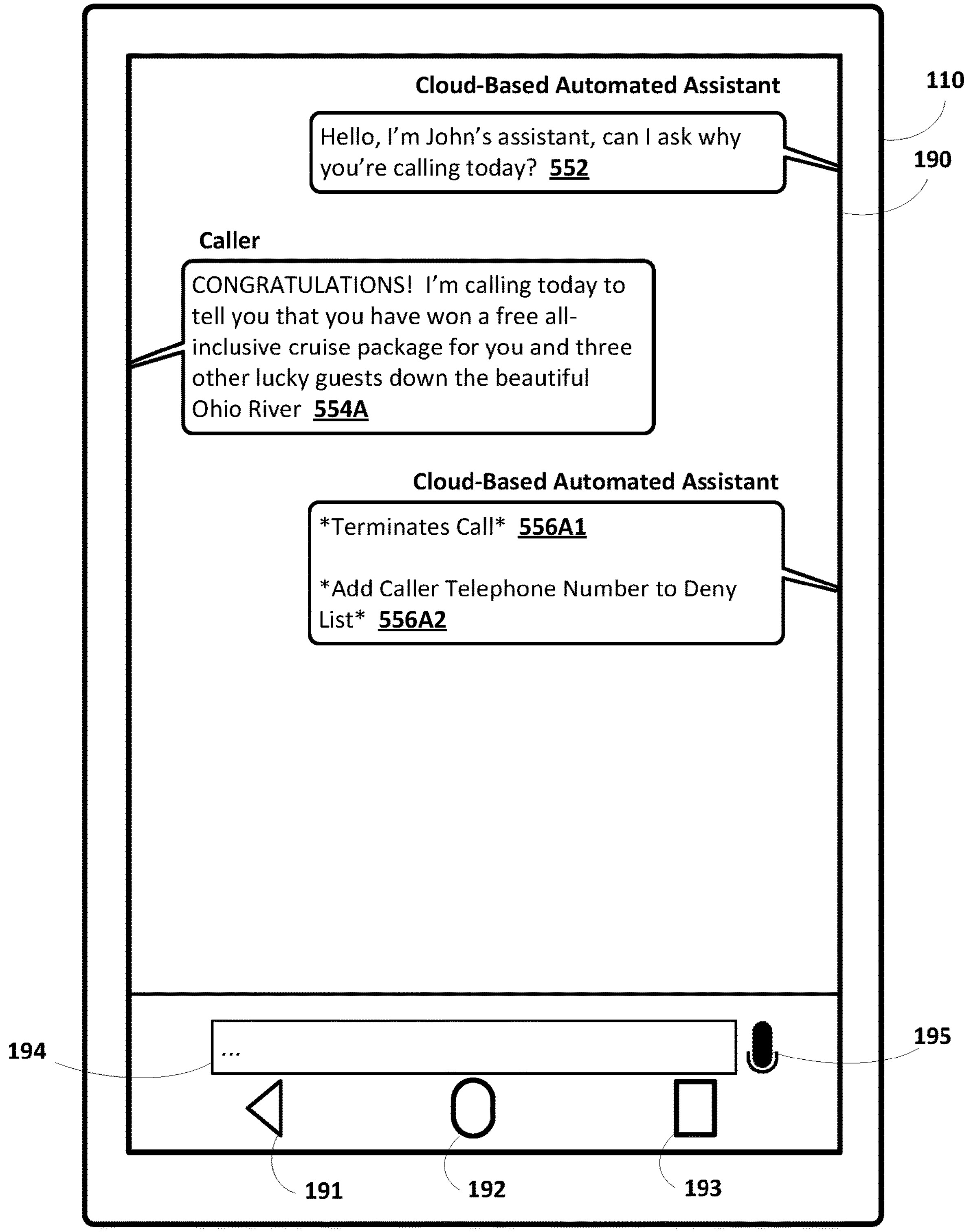
FIG. 5A, FIG. 5B, FIG. 5C, FIG. 5D, and FIG. 5E depict various non-limiting examples of implementing a cloud-based automated assistant to handle incoming telephone calls, in accordance with various implementations.

For the sake of example throughout FIGS. 5A-5A, assume that a cloud-based automated assistant receives an indication of an incoming telephone call that is directed to the client device 110. In this example, an indication of the incoming telephone call can be routed directly to remote server(s) that are remote from the client device 110 and that can execute the cloud-based automated assistant. Additionally, or alternatively, the incoming telephone call can be initially routed to the client device 110 and then to the remote server(s) that are remote from the client device 110 and that execute the cloud-based automated assistant. Further assume that the cloud-based automated assistant determines to answer the incoming telephone call (e.g., a telephone number associated with a caller that initiated the incoming telephone call is not included on a deny list of telephone numbers). Further assume that the cloud-based automated assistant generated synthesized speech 552 of "Hello, I'm John's assistant, can I ask why you're calling?" and causes the synthesized speech 552 to be rendered at a client device of the caller.

Referring specifically to FIG. 5A, assume that, in response to the synthesized speech 552 being rendered at the client device of the caller, audio data 554A of "CONGRATULATIONS! I'm calling today to tell you that you have won a free all-inclusive cruise package for you and three other lucky guests down the beautiful Ohio River". The cloud-based automated assistant can process the audio data 554A using various ML model(s) (e.g., stored in the ML model(s) database 130A) to determine content of the conversation. Further assume, and based on processing the audio data 554A, that the termination engine 171 determines the telephone call is a likely scam based on the content of the conversation. For instance, the termination engine 171 can determine the telephone call is a scam based on known "free cruise" scam telephone call campaigns to elicit user information, based on "all-inclusive cruise packages" being unavailable for the "Ohio River", and/or based on other content of the conversation. Accordingly, in this example, the cloud-based automated assistant can terminate the call as indicated by 556A1, and without considering any user state of the user of the client device 110 and/or any client device state of the client device 110. Further, in various implementations, the cloud-based automated assistant can add the caller's telephone number to a deny list of telephone numbers as indicated by 556A2. As a result, the cloud-based automated assistant not only protects the user from a scam based on the conversation on FIG. 5A, but the cloud-based automated assistant also protects other users from the scam or other scams associated with the caller's telephone number.

Figure 5B:
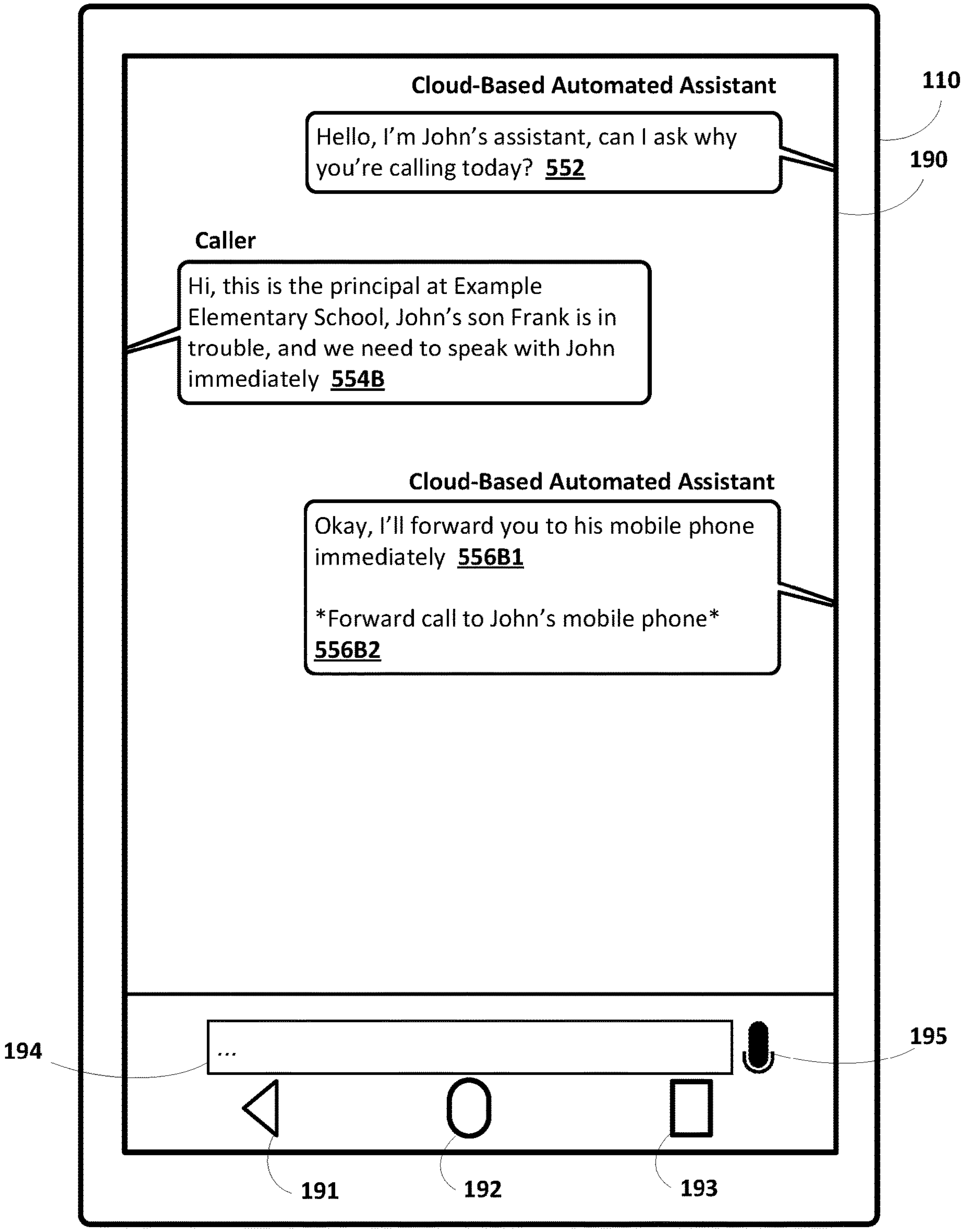

Referring specifically to FIG. 5B, assume that, in response to the synthesized speech 552 being rendered at the client device of the caller, audio data 554B of "Hi, this is the principal at Example Elementary School, John's son Frank is in trouble, and we need to speak with John immediately". Similarly, the cloud-based automated assistant can process the audio data 554B using various ML model(s) (e.g., stored in the ML model(s) database 130A) to determine content of the conversation. Further assume, and based on processing the audio data 554B, that the termination engine 171 determines the telephone call is not a scam (e.g., based on the user profile data of the user of the client device 110 indicating that they have a son enrolled at Example Elementary School, based on location data of the user of the client device 110 indicating that they are often located at a location associated with the school, etc.). Accordingly, the cloud-based automated assistant can leverage the other sub-engines of the next action engine 170 to determine the next action.

For instance, the forwarding engine 172 can determine to forward the telephone call to the client device 110 of the user. In this instance, and in determining where to forward the telephone call, the forwarding engine 172 can consider a user state of the user of the client device 110 and/or a client device state of the client device 110. In the example of FIG. 5B, further assume that the user state and/or the client device state indicates that the user is proximate to the client device 110 and that the client device has greater than a threshold state of charge. Accordingly, in the example of FIG. 5B, the forwarding engine 172 can determine to forward the telephone call to the client device 110 of the user, and in lieu of forwarding the telephone call to any other client device of the user. As a result, the cloud-based automated assistant can generate synthesized speech 556B1 of "Okay, I'll forward you to his mobile phone immediately" and cause the telephone call to be forwarded to John's mobile phone as indicated by 556B2. This forwarding can cause John's mobile phone to ring as if the telephone call is an incoming telephone call directed to the mobile phone (e.g., the client device 110).

Figure 5C:
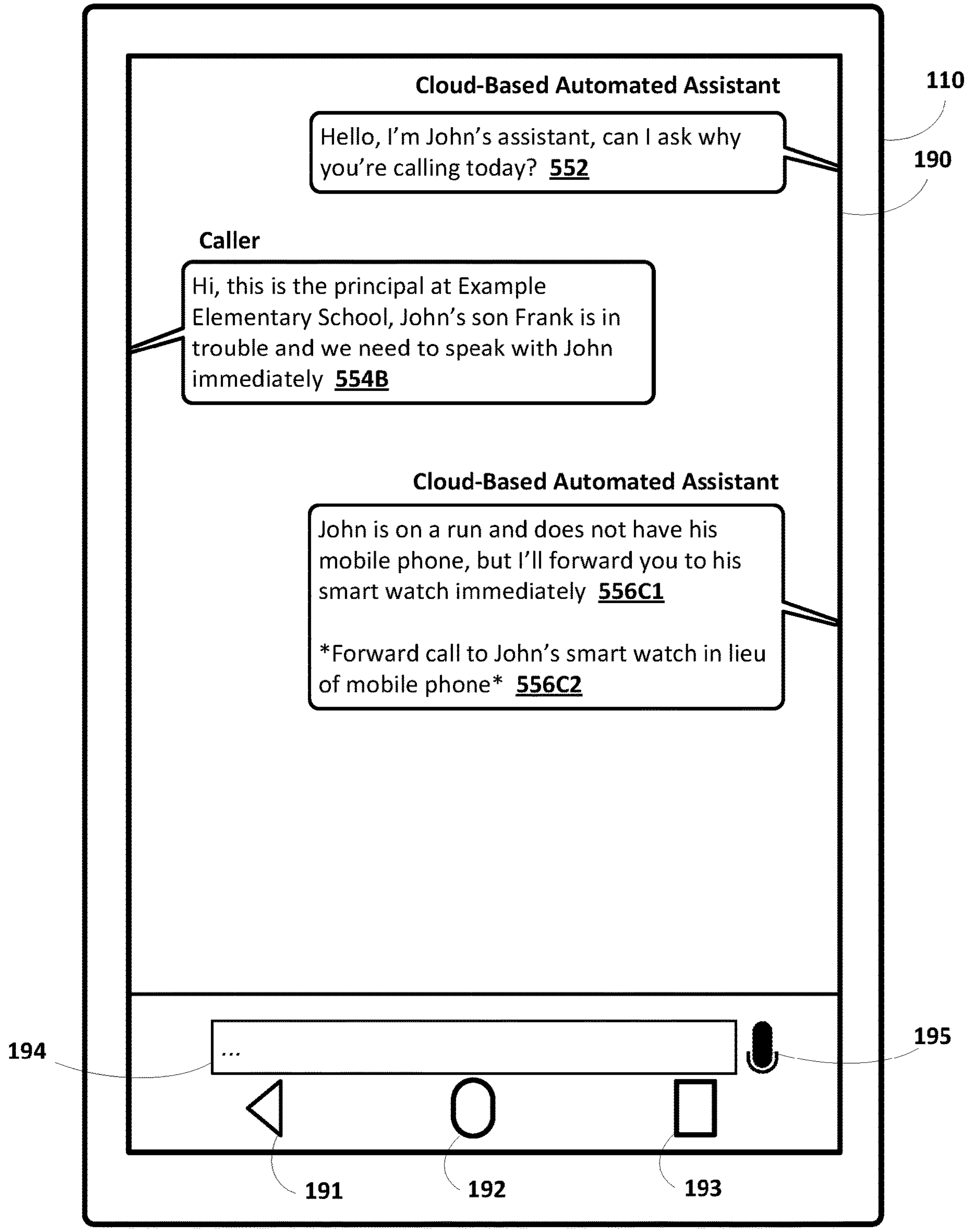

In contrast, and referring specifically to FIG. 5C, further assume the user state and/or the client device state indicates that the user is not proximate to the client device 110 and that software application data indicates that a running application on smart watch of the user is being actively utilized. In this instance, the forwarding engine 172 can infer that the user is running and left the mobile device at home. Accordingly, in the example of FIG. 5C, the forwarding engine 172 can determine to forward the telephone call to an additional client device of the user (e.g., the user's smart watch), and in lieu of forwarding the telephone call to the client device 110. Notably, although the smart watch is also associated with the user of the client device 110, the smart watch may be associated with a different telephone number than the client device 110. As a result, the cloud-based automated assistant can generate synthesized speech 556C1 of "John is on a run and does not have his mobile phone, but I'll forward you to his smart watch immediately" and cause the telephone call to be forwarded to John's smart watch as indicated by 556C2. This forwarding can cause John's smart watch to ring as if the telephone call is an incoming telephone call directed to John's smart watch (e.g., an additional client device that is in addition to the client device 110 to which the incoming telephone call was initially directed).

Figure 5D:
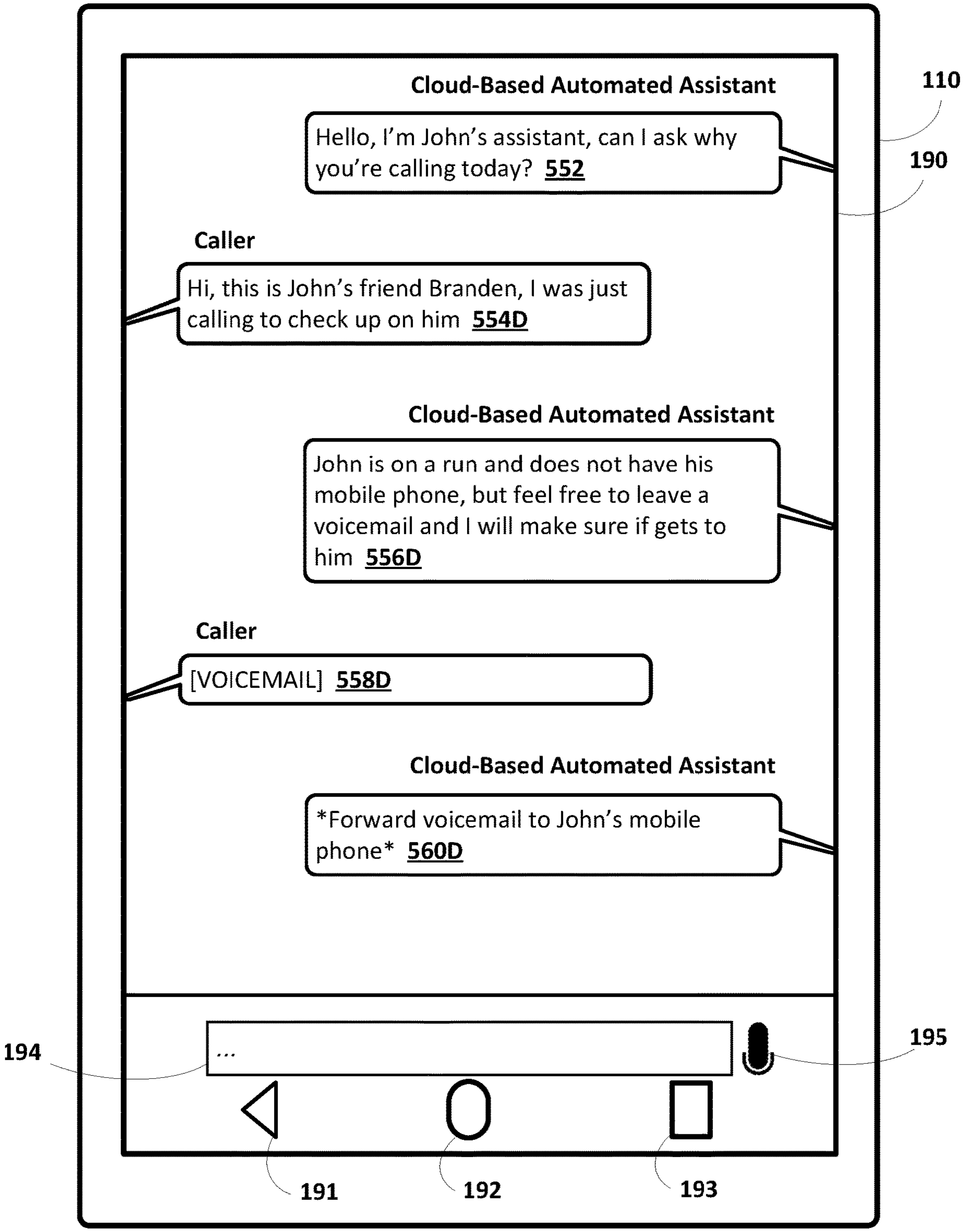

Referring specifically to FIG. 5D, assume that, in response to the synthesized speech 552 being rendered at the client device of the caller, audio data 554D of "Hi, this is John's friend Branden, I was just calling to check up on him". Similarly, the cloud-based automated assistant can process the audio data 554D using various ML model(s) (e.g., stored in the ML model(s) database 130A) to determine content of the conversation. Further assume, like in the example of FIG. 5C, the user state and/or the client device state indicates that the user is not proximate to the client device 110 and that software application data indicates that a running application on smart watch of the user is being actively utilized. However, in contrast with the examples of FIGS. 5B and 5C, the content of the conversation may not indicate that the telephone call is urgent (e.g., the principal needing to speak with John immediately in FIGS. 5B and 5C vs. John's friend checking up on him in FIG. 5D). For instance, rather than forwarding the telephone call to John's smart watch like in the example of FIG. 5C, the voicemail engine 173 can determine to instruct the caller to leave a voicemail. Accordingly, in this example, the cloud-based automated assistant can generate synthesized speech 556D of "John is on a run and does not have his mobile phone, but feel free to leave a voicemail and I will make sure it gets to him", the caller can leave the voicemail with the cloud-based automated assistant as indicated by 558D, and the cloud-based automated assistant can forward the voicemail to John's mobile phone as indicated by 560D.

Figure 5E:
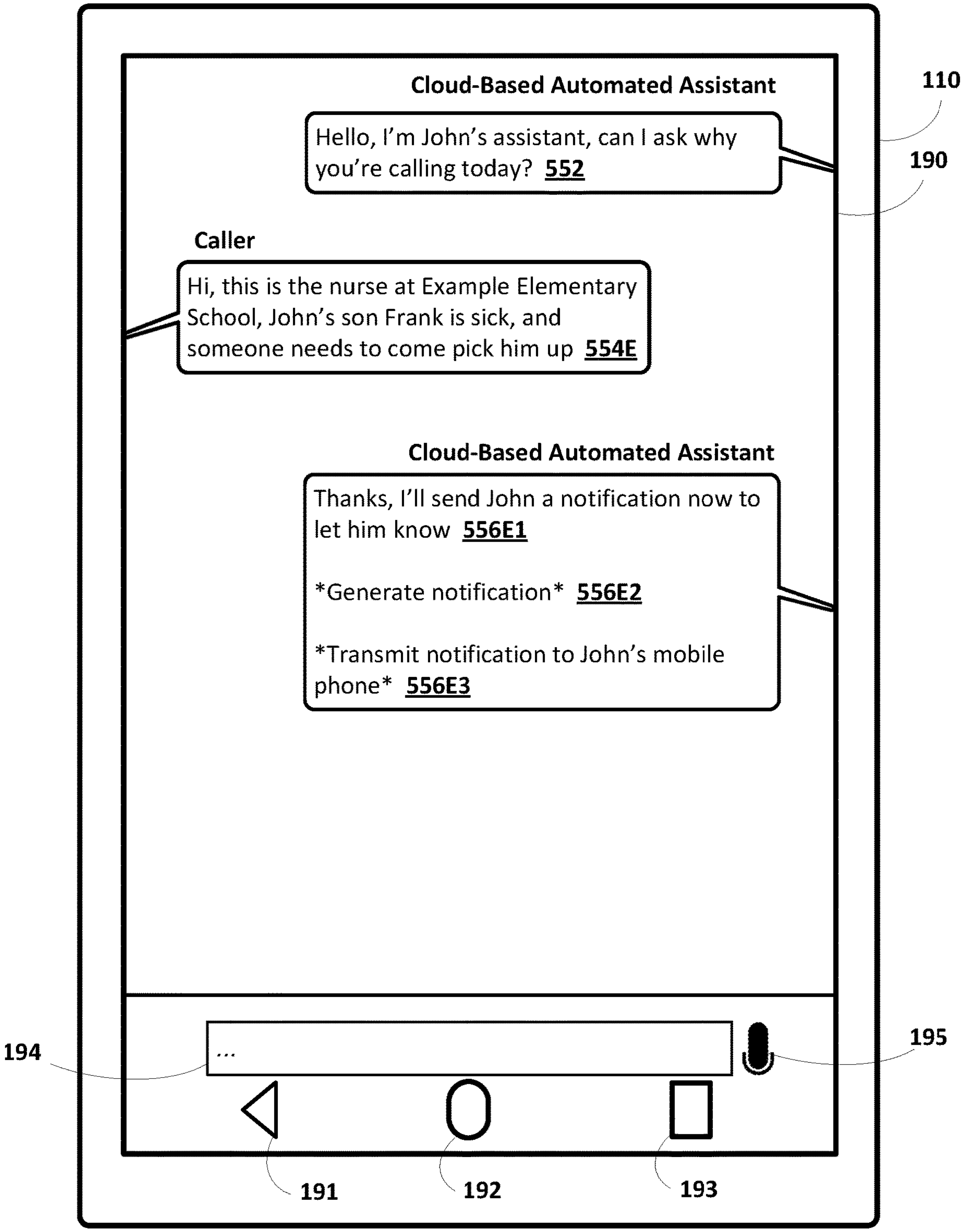

Referring specifically to FIG. 5E, assume that, in response to the synthesized speech 552 being rendered at the client device of the caller, audio data 554E of "Hi, this is the nurse at Example Elementary School, John's son Frank is sick, and someone needs to come pick him up". Similarly, the cloud-based automated assistant can process the audio data 554E using various ML model(s) (e.g., stored in the ML model(s) database 130A) to determine content of the conversation. Further assume, like in the example of FIG. 5B, the user state and/or the client device state indicates that the user is proximate to the client device 110 and that the client device 110 has above a threshold state of charge. However, in contrast with the example of FIG. 5B, the content of the conversation may not indicate that the telephone call is urgent (e.g., the principal needing to speak with John immediately in FIG. 5B vs. John being notified that someone needs to pick up his son in FIG. 5E). For instance, rather than forwarding any telephone call to John's mobile phone like in FIG. 5B (or John's smart watch like in the example of FIG. 5C), the notification engine 174 can determine to generate a notification based on the conversation. Accordingly, in this example, the cloud-based automated assistant can generate synthesized speech 556E1 of "Thanks, I'll send John a notification now to let him know", generate the notification as indicated by 556E2, and the cloud-based automated assistant can transmit the notification to John's mobile phone as indicated by 556E3.

Although particular content of conversations is described above with respect to FIGS. 5A-5E in determining the next actions to be implemented by the cloud-based automated assistant, it should be understood that the content of the conversations is provided to illustrate various techniques contemplated herein and is not meant to be limiting. Rather, it should be understood that the content of the conversations is dependent on speech provided by the caller that initiated the incoming call. Further, although particular user states and/or client device states are described above with respect to FIGS. 5A-5E in determining the next actions to be implemented by the cloud-based automated assistant, it should be understood that the user states and/or client device states are provided to illustrate various techniques contemplated herein and is not meant to be limiting. Rather, it should be understood that the user states and/or client device states are dependent on signals that are available to the cloud-based automated assistant and dependent on the user and/or client device(s) of the user.

Figure 6:
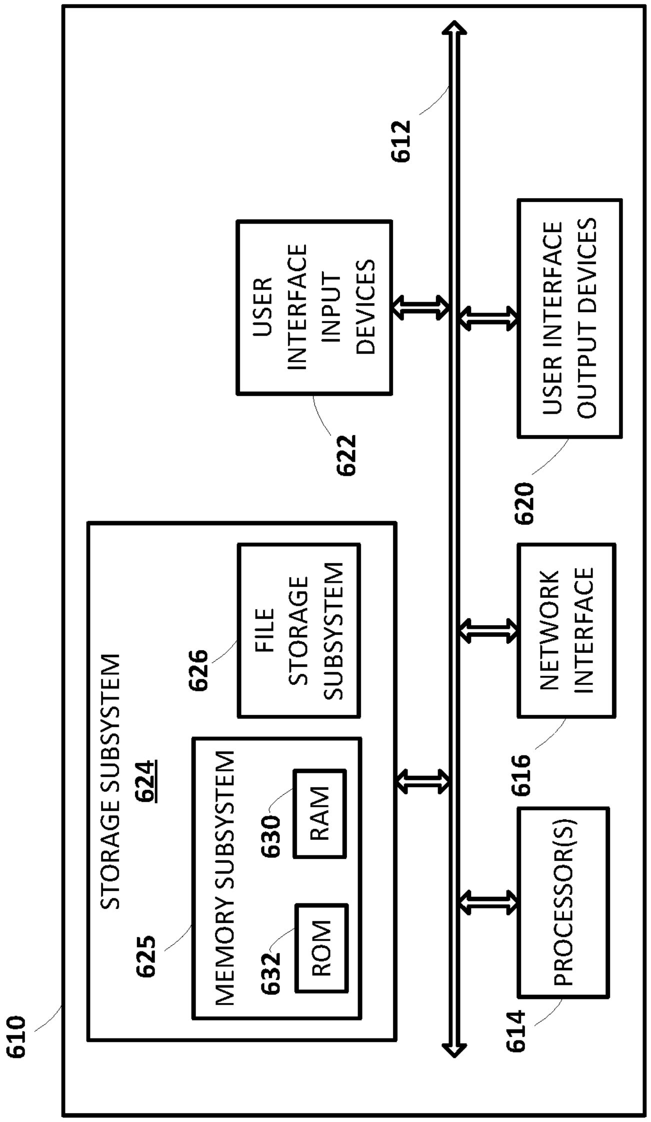
FIG. 6 depicts an example architecture of a computing device, in accordance with various implementations.

Turning now to FIG. 6, a block diagram of an example computing device 610 that may optionally be utilized to perform one or more aspects of techniques described herein. In some implementations, one or more of a client device, remote system component(s), and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display (e.g., a touch sensitive display), audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods disclosed herein, as well as to implement various components depicted in FIGS. 1 and 2.

These software modules are generally executed by processor 614 alone or in combination with other processors. Memory 625 used in the storage subsystem 624 can include a number of memories including a main random-access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem 612 may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes: receiving an indication of an incoming telephone call, the incoming telephone call being directed to a client device of a user, and the indication of the incoming telephone call being received via a cloud-based automated assistant executing at least in part at a remote server that is remote from the client device; determining whether to cause the cloud-based automated assistant to answer the incoming telephone call; in response to determining to cause the cloud-based automated assistant to answer the incoming telephone call: causing the cloud-based automated assistant to answer the incoming telephone call and conduct a conversation with a caller that initiated the incoming telephone call; determining, based on the cloud-based automated assistant conducting conversation with the caller that initiated the incoming telephone call, a next action to be implemented by the cloud-based automated assistant; and causing the next action to be implemented by the cloud-based automated assistant.

These and other implementations of technology disclosed herein can optionally include one or more of the following features.

In some implementations, determining whether to cause the cloud-based automated assistant to answer the incoming telephone call may be based on a caller telephone number associated with the caller that initiated the incoming telephone call.

In some versions of those implementations, determining whether to cause the cloud-based automated assistant to answer the incoming telephone call based on the caller telephone number associated with the caller that initiated the incoming telephone call may include: comparing the caller telephone number to a deny list of telephone numbers; and determining, based on comparing the caller telephone number to the deny list of telephone numbers; whether the caller telephone number is included on the deny list of telephone numbers. Determining to cause the cloud-based automated assistant to answer the incoming telephone call may be in response to determining that the caller telephone number is not included on the deny list of telephone numbers.

In some further versions of those implementations, the method may further include, in response to determining that the caller telephone number is included on the deny list of telephone numbers: refraining from causing the cloud-based automated assistant to answer the incoming telephone call.

In some yet further versions of those implementation, no indication of the incoming telephone call may be rendered at the client device of the user.

In some implementations, causing the cloud-based automated assistant to conduct the conversation with the caller that initiated the incoming telephone call may include: causing the cloud-based automated assistant to generate one or more corresponding instances of synthesized speech; causing the cloud-based automated assistant to render one or more of the corresponding instances of the synthesized speech, at an additional client device of the caller, to conduct the conversation with the caller that initiated the incoming telephone call; receiving one or more corresponding instances of audio data that each capture speech of the caller; and determining, based on one or more of the corresponding instances of the audio data, the next action to be implemented by the cloud-based automated assistant.

In some versions of those implementations, the method may further include determining, based on one or more of the corresponding instances of the audio data, to forward the incoming telephone call to the client device of the user as the next action to be implemented by the cloud-based automated assistant; and causing the incoming telephone call to be forwarded to the client device.

In some further versions of those implementations, causing the incoming telephone call to be forwarded to the client device may cause the client device to ring based on the incoming telephone call.

In some additional or alternative further versions of those implementations, determining to forward the incoming telephone call to the client device as the next action to be implemented by the cloud-based automated assistant may be further based on a user state of the user and/or a client device state of the client device indicating that the user is currently available to answer the incoming telephone call at the client device.

In additional or alternative versions of those implementations, the method may further include determining, based on one or more of the corresponding instances of the audio data, to generate a notification associated with the incoming telephone call as the next action to be implemented by the cloud-based automated assistant; and causing the notification to be rendered at the client device of the user.

In some further versions of those implementations, causing the notification to be rendered at the client device of the user may include causing notification data to be transmitted to the client device that, when received, causes the client device to visually render the notification and without causing the client device to ring based on the incoming telephone call.

In some additional or alternative further versions of those implementations, determining to generate the notification associated with the telephone call as the next action to be implemented by the cloud-based automated assistant may be further based on a user state of the user and/or a client device state of the client device indicating that the user is not currently available to answer the incoming telephone call.

In additional or alternative versions of those implementations, the method may further include determining, based on one or more of the corresponding instances of the audio data, to forward the incoming telephone call to a further additional client device of the user as the next action to be implemented by the cloud-based automated assistant, the further additional client device being associated with a different telephone number than that of callee telephone number associated with the client device; and causing the incoming telephone call to be forwarded to the further additional client device.

In some further versions of those implementations, causing the incoming telephone call to be forwarded to the further additional client device may cause the further additional client device to ring based on the incoming telephone call.

In some additional or alternative further versions of those implementations, determining to forward the incoming telephone call to the further additional client device as the next action to be implemented by the cloud-based automated assistant may be further based on a user state of the user and/or a client device state of the client device indicating that the user is currently available to answer the incoming telephone call at the further additional client device, but not at the client device.

In additional or alternative versions of those implementations, the method may further include determining, based on one or more of the corresponding instances of the audio data, to terminate the incoming telephone call.

In some further versions of those implementations, determining to terminate the incoming telephone call may be based on content included in one or more of the corresponding instances of the audio data.

In additional or alternative versions of those implementations, the method may further include determining, based on one or more of the corresponding instances of the audio data, to instruct the caller that initiated the incoming telephone call to leave a voicemail; and causing the voicemail to be forwarded to the client device.

In some further versions of those implementations, causing the voicemail to be forwarded to the client device may cause the client device to render an indication of the voicemail.

In some additional or alternative further versions of those implementations, determining to instruct the caller that initiated the incoming telephone call to leave the voicemail as the next action to be implemented by the cloud-based automated assistant is further based on a user state of the user and/or a client device state of the client device indicating that the user is not currently available to answer the incoming telephone call.

In some implementations, a method implemented by one or more processors is provided, and includes: receiving an indication of an incoming telephone call, the incoming telephone call being directed to a client device of a user, and the indication of the incoming telephone call being received via a cloud-based automated assistant executing at least in part at a remote server that is remote from the client device; receiving an indication of a user state of the user and/or a client device state of the client device; determining, based on the user state of the user and/or the client device state of the client device, whether to forward the incoming telephone call to the client device or instruct a caller that initiated the incoming telephone call to leave a voicemail; in response to determining to instruct the caller that initiated the incoming telephone call to leave the voicemail: causing the cloud-based automated assistant to generate one or more corresponding instances of synthesized speech; causing the cloud-based automated assistant to render one or more of the corresponding instances of the synthesized speech, at an additional client device of the caller, to instruct the caller to leave the voicemail; and in response to determining that the caller has left the voicemail: causing the voicemail to be transmitted to the client device or an additional client device of the user.

These and other implementations of technology disclosed herein can optionally include one or more of the following features.

In some implementations, determining whether to forward the incoming telephone call to the client device or instruct the caller that initiated the incoming telephone call to leave a voicemail may be based on the user state of the user, and the user state of the user may indicate one or more of: that the user is not currently available to answer the incoming telephone call at the client device, or that the user is a threshold distance away from the client device.

In some versions of those implementations, the user state of the user may be determined based on calendar information associated with the user, software application activity data associated with the user, user profile data associated with the user, or sensor data generated by the client device.

In some implementations, determining whether to forward the incoming telephone call to the client device or instruct the caller that initiated the incoming telephone call to leave a voicemail may be based on the client device state of the client device, and the client device state of the client device may indicate one or more of: that a state of charge of the client device is below a threshold, that a mode of the client device indicates that the user is not currently available to answer the incoming telephone call at the client device, or that the client device is a threshold distance away from the user.

In some versions of those implementations, the client device state of the client device may be determined based on sensor data generated by the client device.

In some implementations, the method may further include, in response to determining to forward the incoming telephone call to the client device: causing the incoming telephone call to be forwarded to the client device.

In some versions of those implementations, causing the incoming telephone call to be forwarded to the client device may cause the client device to ring based on the incoming telephone call.

In some implementations, causing the voicemail to be forwarded to the client device may cause the client device to render an indication of the voicemail.

In some implementations, causing the voicemail to be transmitted to the client device or the additional client device may include causing the voicemail to be transmitted to the client device in response to determining that the client device has a threshold state of charge and is within a threshold distance of the user.

In some implementations, causing the voicemail to be transmitted to the client device or the additional client device may include causing the voicemail to be transmitted to the additional client device in response to determining that the client device does not have a threshold state of charge or is not within a threshold distance of the user.

In some implementations, a method implemented by one or more processors is provided, and includes: receiving an incoming telephone call, the incoming telephone call being directed to a client device of a user, and the incoming telephone call being received via an automated assistant executing at least in part at the client device; determining a user state of the user and/or a client device state of the client device; determining, based on the user state of the user and/or the client device state of the client device, whether to forward the incoming telephone call to a remote server to be handled by a cloud-based automated assistant executing at least in part the remote server; and in response to determining to forward the incoming telephone call to the remote server to be handled by the cloud-based automated assistant: transmitting, to the remote server, an indication of the incoming telephone call. Transmitting the indication of the incoming telephone call to the remote server causes the cloud-based automated assistant to: determine a next action to be implemented for handling the incoming telephone call; and cause the next action to be implemented for handling the incoming telephone call.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

What is claimed is:

1. A method implemented by one or more processors, the method comprising:

receiving an indication of an incoming telephone call, the incoming telephone call being directed to a client device of a user, and the indication of the incoming telephone call being received via a cloud-based automated assistant executing at least in part at a remote server that is remote from the client device;

determining whether to cause the cloud-based automated assistant to answer the incoming telephone call;

in response to determining to cause the cloud-based automated assistant to answer the incoming telephone call:

causing the cloud-based automated assistant to answer the incoming telephone call and conduct a conversation with a caller that initiated the incoming telephone call, wherein causing the cloud-based automated assistant to conduct the conversation with the caller that initiated the incoming telephone call comprises:

causing the cloud-based automated assistant to generate and render one or more corresponding instances of synthesized speech, at an additional client device of the caller, to conduct the conversation with the caller that initiated the incoming telephone call; and receiving one or more corresponding instances of audio data that each capture speech of the caller;

determining, based on the one or more corresponding instances of audio data, whether to cause the cloud-based automated assistant to: (1) forward the incoming telephone call to the client device of the user, (2) instruct the caller to leave a voicemail and forward the voicemail to the client device of the user, or (3) terminate the incoming telephone call; and causing, based on the determination, the cloud-based automated assistant to: (1) forward the incoming telephone call to the client device of the user, (2) instruct the caller to leave a voicemail and forward the voicemail to the client device of the user, or (3) terminate the incoming telephone call.

2. The method of claim 1, wherein determining whether to cause the cloud-based automated assistant to answer the incoming telephone call is based on a caller telephone number associated with the caller that initiated the incoming telephone call.

3. The method of claim 2, wherein determining whether to cause the cloud-based automated assistant to answer the incoming telephone call based on the caller telephone number associated with the caller that initiated the incoming telephone call comprises:

comparing the caller telephone number to a deny list of telephone numbers; and determining, based on comparing the caller telephone number to the deny list of telephone numbers, whether the caller telephone number is included on the deny list of telephone numbers, wherein determining to cause the cloud-based automated assistant to answer the incoming telephone call is in response to determining that the caller telephone number is not included on the deny list of telephone numbers.

4. The method of claim 3, further comprising:

in response to determining that the caller telephone number is included on the deny list of telephone numbers:

refraining from causing the cloud-based automated assistant to answer the incoming telephone call.

5. The method of claim 4, wherein no indication of the incoming telephone call is rendered at the client device of the user.

6. The method of claim 1, further comprising:

determining, based on the one or more corresponding instances of audio data, to (1) forward the incoming telephone call to the client device of the user; and causing the incoming telephone call to be forwarded to the client device.

7. The method of claim 6, wherein causing the incoming telephone call to be forwarded to the client device causes the client device to ring based on the incoming telephone call.

8. The method of claim 6, wherein determining to (1) forward the incoming telephone call to the client device is further based on a user state of the user and/or a client device state of the client device indicating that the user is currently available to answer the incoming telephone call at the client device.

9. The method of claim 1, further comprising:

determining, based on the one or more corresponding instances of audio data, to (3) terminate the incoming telephone call.

10. The method of claim 9, wherein determining to (3) terminate the incoming telephone call is based on content included in the one or more corresponding instances of audio data.

11. The method of claim 1, further comprising:

determining, based on the one or more corresponding instances of audio data, to (2) instruct the caller that initiated the incoming telephone call to leave a voicemail, wherein determining to (2) instruct the caller that initiated the incoming telephone call to leave the voicemail is further based on a user state of the user and/or a client device state of the client device indicating that the user is not currently available to answer the incoming telephone call; and causing the voicemail to be forwarded to the client device, wherein causing the voicemail to be forwarded to the client device causes the client device to render an indication of the voicemail.

12. A system comprising:

at least one processor; and memory storing instructions that, when executed by the at least one processor, cause the at least one processor to be operable to:

receive an indication of an incoming telephone call, the incoming telephone call being directed to a client device of a user, and the indication of the incoming telephone call being received via a cloud-based automated assistant executing at least in part at a remote server that is remote from the client device;

determine whether to cause the cloud-based automated assistant to answer the incoming telephone call;

in response to determining to cause the cloud-based automated assistant to answer the incoming telephone call:

cause the cloud-based automated assistant to answer the incoming telephone call and conduct a conversation with a caller that initiated the incoming telephone call, wherein the instructions to cause the cloud-based automated assistant to conduct the conversation with the caller that initiated the incoming telephone call comprise instructions to:

cause the cloud-based automated assistant to generate and render one or more corresponding instances of synthesized speech, at an additional client device of the caller, to conduct the conversation with the caller that initiated the incoming telephone call; and receive one or more corresponding instances of audio data that each capture speech of the caller;

determine, based on the one or more corresponding instances of audio data, whether to cause the cloud-based automated assistant to: (1) forward the incoming telephone call to the client device of the user, (2) instruct the caller to leave a voicemail and forward the voicemail to the client device of the user, or (3) terminate the incoming telephone call; and cause, based on the determination, the cloud-based automated assistant to: (1) forward the incoming telephone call to the client device of the user, (2) instruct the caller to leave a voicemail and forward the voicemail to the client device of the user, or (3) terminate the incoming telephone call.

13. The system of claim 12, wherein determining whether to cause the cloud-based automated assistant to answer the incoming telephone call is based on a caller telephone number associated with the caller that initiated the incoming telephone call; and wherein the instructions to determine whether to cause the cloud-based automated assistant to answer the incoming telephone call based on the caller telephone number associated with the caller that initiated the incoming telephone call comprise instructions to:

compare the caller telephone number to a deny list of telephone numbers; and determine, based on comparing the caller telephone number to the deny list of telephone numbers, whether the caller telephone number is included on the deny list of telephone numbers, wherein determining to cause the cloud-based automated assistant to answer the incoming telephone call is in response to determining that the caller telephone number is not included on the deny list of telephone numbers.

14. The system of claim 13, wherein the instructions further cause the at least one processor to be operable to:

in response to determining that the caller telephone number is included on the deny list of telephone numbers:

refrain from causing the cloud-based automated assistant to answer the incoming telephone call.

15. The system of claim 14, wherein no indication of the incoming telephone call is rendered at the client device of the user.

16. The system of claim 12, wherein the instructions further cause the at least one processor to be operable to:

determine, based on the one or more corresponding instances of audio data, to (1) forward the incoming telephone call to the client device of the user; and cause the incoming telephone call to be forwarded to the client device, wherein causing the incoming telephone call to be forwarded to the client device causes the client device to ring based on the incoming telephone call.

17. The system of claim 16, wherein determining to (1) forward the incoming telephone call to the client device is further based on a user state of the user and/or a client device state of the client device indicating that the user is currently available to answer the incoming telephone call at the client device.

18. The system of claim 12, wherein the instructions further cause the at least one processor to be operable to:

determine, based on the one or more corresponding instances of audio data, to (3) terminate the incoming telephone call, wherein determining to (3) terminate the incoming telephone call is based on content included in the one or more corresponding instances of the audio data.

19. The system of claim 12, wherein the instructions further cause the at least one processor to be operable to:

determine, based on the one or more corresponding instances of audio data, to (2) instruct the caller that initiated the incoming telephone call to leave a voicemail, wherein determining to (2) instruct the caller that initiated the incoming telephone call to leave the voicemail is further based on a user state of the user and/or a client device state of the client device indicating that the user is not currently available to answer the incoming telephone call; and causing the voicemail to be forwarded to the client device, wherein causing the voicemail to be forwarded to the client device causes the client device to render an indication of the voicemail.

20. A non-transitory computer-readable storage medium storing instructions that, when executed by at least one processor, cause the at least one processor to be operable to perform operations, the operations comprising:

receiving an indication of an incoming telephone call, the incoming telephone call being directed to a client device of a user, and the indication of the incoming telephone call being received via a cloud-based automated assistant executing at least in part at a remote server that is remote from the client device;

determining whether to cause the cloud-based automated assistant to answer the incoming telephone call;

in response to determining to cause the cloud-based automated assistant to answer the incoming telephone call:

causing the cloud-based automated assistant to answer the incoming telephone call and conduct a conversation with a caller that initiated the incoming telephone call, wherein causing the cloud-based automated assistant to conduct the conversation with the caller that initiated the incoming telephone call comprises:

causing the cloud-based automated assistant to generate and render one or more corresponding instances of synthesized speech, at an additional client device of the caller, to conduct the conversation with the caller that initiated the incoming telephone call; and receiving one or more corresponding instances of audio data that each capture speech of the caller;

determining, based on the one or more corresponding instances of audio data, whether to cause the cloud-based automated assistant to: (1) forward the incoming telephone call to the client device of the user, (2) instruct the caller to leave a voicemail and forward the voicemail to the client device of the user, or (3) terminate the incoming telephone call; and causing, based on the determination, the cloud-based automated assistant to: (1) forward the incoming telephone call to the client device of the user, (2) instruct the caller to leave a voicemail and forward the voicemail to the client device of the user, or (3) terminate the incoming telephone call.

* * * * *